US006548197B1

(12) United States Patent
Chandran et al.

(10) Patent No.: US 6,548,197 B1
(45) Date of Patent: Apr. 15, 2003

(54) SYSTEM INTEGRATION OF A STEAM REFORMER AND FUEL CELL

(75) Inventors: Ravi Chandran, Ellicott City, MD (US); Momtaz N. Mansour, Highland, MD (US)

(73) Assignee: Manufacturing & Technology Conversion International, Inc., Baltimore, MD (US)

( * ) Notice: Subject to any disclaimer, the term of this patent is extended or adjusted under 35 U.S.C. 154(b) by 133 days.

(21) Appl. No.: 09/641,873

(22) Filed: Aug. 18, 2000

Related U.S. Application Data
(60) Provisional application No. 60/149,797, filed on Aug. 19, 1999.

(51) Int. Cl.[7] ............................................. H01M 8/06
(52) U.S. Cl. ........................................ 429/17; 429/19
(58) Field of Search ............................ 429/2, 3, 12, 13, 429/17, 19

(56) References Cited

U.S. PATENT DOCUMENTS

| | | | |
|---|---|---|---|
| 2,937,500 A | 5/1960 | Bodine, Jr. | |
| 4,588,659 A | 5/1986 | Abens et al. | |
| 4,928,223 A | 5/1990 | Dao et al. | |
| 4,976,940 A | 12/1990 | Paulson | |
| 5,059,404 A | 10/1991 | Mansour et al. | |
| 5,094,926 A | 3/1992 | Kobayashi et al. | |
| 5,133,297 A | 7/1992 | Mansour | |
| 5,197,399 A | 3/1993 | Mansour | |
| 5,205,728 A | 4/1993 | Mansour | |
| 5,208,113 A | 5/1993 | Kinoshita | |
| 5,211,704 A | 5/1993 | Mansour | |
| 5,255,634 A | 10/1993 | Mansour | |
| 5,285,629 A | 2/1994 | Grounder | |
| 5,306,481 A | 4/1994 | Mansour et al. | |
| 5,353,721 A | 10/1994 | Mansour et al. | |
| 5,366,371 A | 11/1994 | Mansour et al. | |
| 5,376,469 A | * 12/1994 | Gur et al. ..................... | 429/17 |
| 5,388,395 A | 2/1995 | Scharpf et al. | |
| 5,536,488 A | 7/1996 | Mansour et al. | |

(List continued on next page.)

FOREIGN PATENT DOCUMENTS

| | | |
|---|---|---|
| DE | 3913322 A1 | 10/1990 |
| EP | 0383565 A1 | 8/1990 |
| EP | 0814146 A2 | 12/1997 |
| EP | 1136542 | 9/2001 |
| WO | WO0027951 | 5/2000 |

OTHER PUBLICATIONS

English abstract of previously cited patent No. DE3913322.
PCT International Search Report dated Dec. 12, 2000.
PCT International Search Report dated Dec. 20, 2000.
U.S. Statutory Invention Registration to Fourie, et al.; Registration No. H1,849 published May 2, 2000.

*Primary Examiner*—Patrick Ryan
*Assistant Examiner*—M. Wills
(74) *Attorney, Agent, or Firm*—Dority & Manning, P.A.

(57) ABSTRACT

A novel process and apparatus for power generation from biomass and other carbonaceous feedstocks are provided. The process integrates a pulse combustor steam reformer with a fuel cell to generate electricity such that (i) efficiencies are higher than those of conventional and emerging advanced power systems, and (ii) emissions are lower than those proposed by the new environmental regulations, i.e. one-tenth of the New Source Performance Standards. The pulse combustor steam reformer generates a hydrogen-rich, medium-Btu fuel gas that is electrochemically oxidized in the fuel cell to generate electricity. The apparatus may be configured to produce only power or combined heat and power.

37 Claims, 17 Drawing Sheets

U.S. PATENT DOCUMENTS

| | | |
|---|---|---|
| 5,554,453 A | 9/1996 | Steinfield et al. |
| 5,637,192 A | 6/1997 | Mansour et al. |
| 5,638,609 A | 6/1997 | Chandran et al. |
| 5,645,951 A | 7/1997 | Johnssen |
| 5,707,762 A | 1/1998 | Johnssen |
| 5,795,666 A | 8/1998 | Johnssen |
| 5,819,522 A | 10/1998 | Topsoe |
| 5,842,289 A | 12/1998 | Chandran et al. |
| 5,900,329 A | 5/1999 | Reiter et al. |
| 5,937,631 A | 8/1999 | Holm-Larsen et al. |
| 5,955,039 A | 9/1999 | Dowdy |
| 5,983,334 A | 11/1999 | Coon et al. |
| 6,032,456 A | 3/2000 | Easom et al. |
| 6,074,769 A | 6/2000 | Johnssen |
| 6,077,620 A | 6/2000 | Pettit |

\* cited by examiner

SYSTEM INTEGRATION OF A STEAM REFORMER AND FUEL CELL

RELATED APPLICATIONS

The present application is based upon a provisional application filed on Aug. 19, 1999 having Ser. No. 60/149,797.

FIELD OF THE INVENTION

The present invention relates to a thermoelectrochemical process and apparatus for very efficient, clean, modular, cost-effective, green and climate-change neutral power or combined heat and power generation from biomass. Other carbonaceous feedstocks can be used as well.

BACKGROUND OF THE INVENTION

Many different options are available for power generation. The fuel can be combusted, gasified, pyrolyzed, bioprocessed or liquefied and utilized in engines, steam power plants (boiler, steam turbine, etc.), gas turbines, gas and steam power plants, and fuel cells. Among these, the most efficient and environmentally superior route for electric power generation is fuel cells. In a fuel cell stack, the fuel is electrochemically reacted with oxygen (from air)—without combustion—producing electricity and usable heat. Efficiencies in the 55 to 70% range (based on HHV) have been projected for fuel cell power generation. The efficiency gain for the fuel cell is especially significant for the small-scale power (10 $kW_e$ to 5 $MW_e$) sector. Gas turbines and combined-cycle units are generally not applicable to this size range due to low efficiency and high cost. Here, the traditional steam power plants are generally less than 20% efficient. Engines are more efficient (20 to 40%) but are typically fired with diesel or natural gas. A fuel cell can, however, achieve between 35 and 55% efficiency. Also, the efficiency of the fuel cell stack remains the same regardless of power level and this is an additional advantage over conventional power generation systems.

Many power plants based on biomass combustion have experienced operational difficulties, especially when firing non-wood biomass fuels. These resulted from the deposition of mineral matter on heat exchange surfaces (boiler tubes, superheaters and water walls) or from the agglomeration of ash in a fluidized bed. Gasification of biomass, in contrast, renders it possible to avoid these problems, minimize emissions and integrate with the fuel cell.

Currently, there exists many different gasifiers, such as high pressure, low pressure, partial oxidation or autothermal, indirectly heated, oxygen/air/steam-blown, fixed/fluidized bed or entrained flow gasification. Each system has its advantages. In contrast to prior systems, however, the pulse combustor steam-reforming technology of the present invention, generates a hydrogen-rich, medium-Btu gas (does not need oxygen input) that is well-suited for fuel cell applications.

In direct gasification, partial oxidation or autothermal reactions are employed which yield inferior partial pressure concentrations of the fuel gas for the fuel cell stack ($H_2$ in the case of phosphoric acid fuel cells and $H_2$ and CO in the case of molten carbonate and solid oxide fuel cell stacks). This is due to the fact that both exothermic and endothermic reactions take place in situ in the case of direct gasification, and the products of exothermic reactions dilute the product gases to be consumed by the fuel cell.

In view of the above, currently, a need exists for a new gasification process that is better suited for power generated applications involving the use of a fuel cell.

SUMMARY OF THE INVENTION

In accordance with the present invention, a process for producing electricity from carbonaceous materials is disclosed. The carbonaceous materials can be, for instance, coal, pulp and paper waste, wood products such as wood chips or sawdust, municipal waste, industrial waste, sewage, food waste, plant matter, rice straw, black liquor and animal waste.

The process includes. providing a fluidized bed containing a particulate material and a fluidizing medium. The fluidizing medium is steam. The particulate material can have a particle size less than about 500 microns and can include sand, alumina, magnesium oxide, an alkali carbonate, carbon, and the like.

Any suitable combustion device can be used to indirectly heat the fluidized bed. In one embodiment, a pulse combustion device combusts a fuel source to form a pulse combustion stream. The pulse combustion stream indirectly heats the fluidized bed. As used herein, indirectly heating the bed means that the pulse combustion stream does not contact the contents of the bed.

A carbonaceous material is fed to the fluidized bed. The fluidized bed is maintained at a temperature sufficient for the carbonaceous materials to endothermically react with the steam to form a product gas stream. The product gas stream can contain, for instance, lower molecular weight hydrocarbons. The product gas stream is then fed to a fuel cell. The fuel cell can include an electrolyte which chemically reacts with the product gas stream to generate electricity.

Any suitable fuel cell can be used in the process of the present invention. Particular fuel cells include a phosphoric acid fuel cell, a molten carbonate fuel cell, or a solid oxide fuel cell.

The temperature in the fluidized bed can be from about 900 degrees F to about 1800 degrees F. and particularly from about 1100 degrees F to about 1600 degrees F. The carbonaceous materials can remain in the bed for a time from about ½ hour to about 15 hours, and particularly from about two hours to about 10 hours. For most applications, the weight ratio between steam and the carbonaceous materials can be from about 0.75:1 to about 3:1.

In order to conserve energy, in one embodiment, a portion of the product gas stream is fed to a heat exchanger that heats steam which is fed to the fluidized bed. Steam can also be generated or heated using the flue gas from the pulse combustion device.

The flue gas of the pulse combustion device can also be used to heat air being fed to the fuel cell or pulse combustion device and can be used to heat or generate steam fed to a dryer for drying the carbonaceous materials prior to being fed to the fluidized bed.

In order to clean the product gas stream prior to being combusted in the gas turbine, the product gas stream can be fed through a cyclone for removing particulate material and can be fed to a scrubber and/or gas polisher for removing any undesirable constituents depending on the fuel cell being utilized.

BRIEF DESCRIPTION OF THE DRAWINGS

A full and enabling disclosure of the present invention, including the best mode thereof, to one skilled in the art, is set forth more particularly in the remainder of the specification including reference to the accompanying figures in which.

Figure 1:
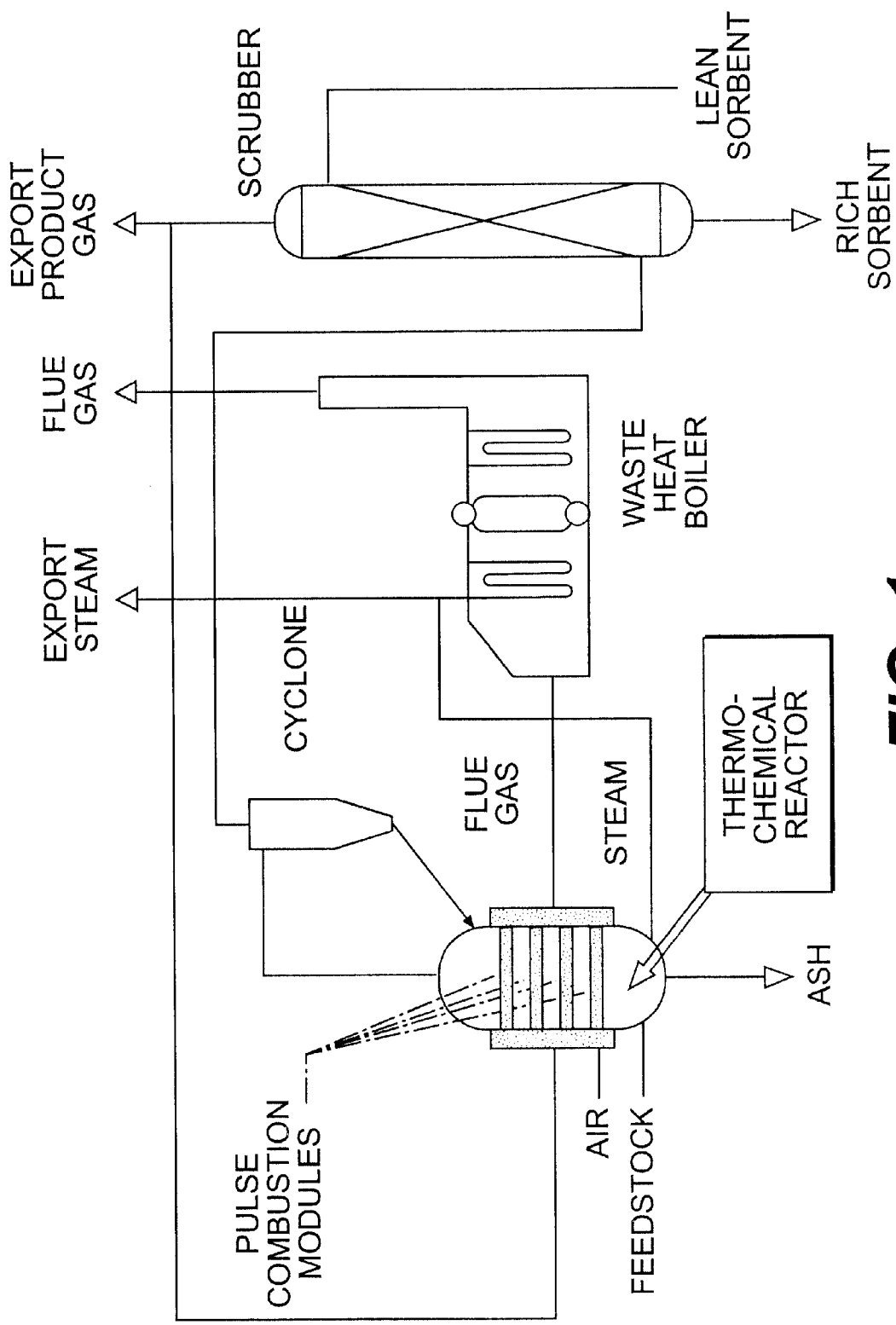
FIG. 1 is a block-flow diagram of a portion of the process of the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The present invention is directed to a gasification process that integrates a steam reformer with a fuel cell. In particular, the present invention is directed to a novel process and apparatus that integrates a pulse combustor with a steam reformer and fuel cell to generate electricity, i.e. a thermo-electrochemical system.

In a process of the present invention, the reactions are solely steam-reforming, endothermic reactions in a reducing environment. The heat of reaction is primarily supplied indirectly by the resonance tubes of one or more modular pulsating burners. This maximizes the partial pressure of the reactants of the reformate gas used in the fuel cell stack and, hence, maximizes the electrical conversion efficiency of the power plant.

One embodiment of a system of the present invention is shown as a simplified schematic in FIG. 1. As shown, the system includes a fluidized bed reactor that is indirectly heated by multiple resonance tubes of one or more pulse combustion modules. Feedstock such as biomass, coal, sludge or spent liquor is fed to the reactor that is fluidized with superheated steam from a waste heat recovery boiler. The organic material injected into the bed undergoes a rapid sequence of vaporization and pyrolysis reactions. Higher hydrocarbons released among the pyrolysis products are steam cracked and partially reformed to produce low molecular weight species. Residual char retained in the bed is more slowly gasified by reaction with steam. Product gases are routed through a cyclone to remove bulk of the entrained particulate matter and are quenched and scrubbed in a venturi scrubber. A portion of the medium-Btu product gases is supplied to the pulse combustion modules and combustion of these gases provides the heat necessary for the indirect gasification process.

The system of the present invention overcomes the limitations of both the oxygen-blown partial oxidation and the two-stage circulating solids gasification systems. In the present invention, the biomass (waste or cultivated) feedstock is typically fed to a single fluidized bed vessel and reacted with steam to generate a hydrogen-rich product gas. The use of a fluidized bed offers an ideal environment for effecting the endothermic steam-reforming reaction with the heat supplied indirectly through heat transfer surfaces that are formed from the resonant section of a pulse combustor immersed within the fluid bed. These pulsations can improve heat transfer rates (as much as 3 to 5 times) through the fire tubes and into the fluid bed. Although the use of pulse combustors is relatively well known in the art, as indicated for example in U.S. Pat. Nos. 5,638,609; 5,133,297; 5,255,634; 5,211,704; 5,205,728; 5,366,371; 5,197,399; 5,353,721 and 5,637,192, which are herein incorporated by reference, it is believed that the novel pulse combustor steam reforming process of the present invention is better suited for power generation applications.

In general, a process of the present invention can generate a synthesis quality product gas from a wide spectrum of feedstocks including biomass, coals, municipal waste, refuse-derived fuel (RDF), industrial sludges, and spent liquor from the pulp and paper industry, all without the use of air or oxygen. The product gas is normally free of both diluent nitrogen and combustion-generated $CO_2$. In a preferred embodiment, the complete reforming process is accomplished using only a single vessel, and no circulation of hot solids is needed. The combustion process utilizing clean product gas eliminates the need for flue gas treatment from the combustors.

In one embodiment, the process of the present invention is directed to using rice straw as the biomass feed. When processing rice straw, silica separates from the straw in the fluidized bed which can be collected and recovered. The silica can then be used to form semiconductor wafers and other useful articles.

In an alternative embodiment, the process of the present invention is directed to using animal waste as the feedstock. In this embodiment, the fluidized bed should be at a temperature of at least 1400 degrees F. When processing animal waste, fertilizer components, such as a nitrogen, phosphorous and potassium can be recovered during the process. Specifically, phosphorous and potassium can be recovered from a particulate removal device that is placed in communication with the product gas stream exiting the fluidized bed. Nitrogen, on the other hand, can be recovered as ammonia from the product gas stream.

Early system tests were performed using three different biomass feeds: pistachio shells, wood chips, and rice hulls; two different sludge waste products from a recycle paper mill; and a Kraft mill sludge (the two sludge wastes differed primarily in their plastic content), Refuse Derived Fuel (RDF), and dried Municipal Sludge Wastewater (MSW). The waste paper sludge was obtained from a mill located in Northern California. The sludge fraction was composed of short fiber and plastic reject material that is recovered from a clarifier. These sludge wastes were representative of high moisture waste materials that are generated in similar mills located throughout the United States. Table 1 summarizes the operating conditions for the various test runs in the bench-scale unit. Temperatures were varied over the range of approximately 1215° F. to 1450° F.

Steam-to-biomass ratios varied from approximately 0.75 to 2.6. Test run durations typically ranged from 4 to 10 hours. No process operating problems were encountered for any of the runs, including those with rice hulls that have a high ash content and low ash fusion point.

The resultant gas compositions from the various biomass waste feedstocks are summarized in Table 2 below. The methane content appears to be relatively constant (5 to 12%) over the range of feeds and processing conditions tested. Higher hydrocarbons show a decreasing trend with increasing temperature and a concomitant increase in hydrogen yields. The ratio between carbon monoxide and carbon dioxide appears relatively constant. The dry gas heating value typically ranged from 370 to 448 Btu/scf.

TABLE 2

GAS COMPOSITIONS AND PRODUCT YIELDS FOR BIOMASS AND MILL SLUDGE TESTS CONDUCTED IN PULSE-ENHANCED INDIRECT STEAM REFORMER

| Composition (Vol. %) | Pistachio Shells | Pistachio Shells | Wood Chips | Rice Hulls | Recycle Mill Fiber Waste | Recycled Waste Paper W/Plastic | Kraft Mill Sludge | RDF Sand Bed | MSW Sand Bed |
|---|---|---|---|---|---|---|---|---|---|
| $H_2$ | 37.86 | 35.04 | 48.11 | 42.83 | 38.86 | 50.50 | 52.94 | 45.54 | 55.21 |
| CO | 18.84 | 23.43 | 22.91 | 19.67 | 23.34 | 19.26 | 11.77 | 25.26 | 28.10 |
| $CO_2$ | 28.73 | 25.20 | 20.18 | 24.40 | 23.27 | 20.10 | 21.94 | 14.51 | 5.95 |
| $CH_4$ | 10.65 | 11.31 | 8.32 | 11.56 | 8.31 | 8.42 | 8.95 | 8.30 | 5.00 |
| $C_2$ | 3.92 | 5.02 | 0.48 | 1.54 | 6.40 | 1.72 | 3.00 | 6.38 | 5.74 |
| Total | 100.00 | 100.00 | 100.00 | 100.00 | 100.18 | 100.00 | 98.60 | 99.99 | 100.00 |
| HHV (Btu/scf) | 370 | 406 | 329 | 367 | 412 | 364 | 372 | 418 | 374 |
| TEMP. (° F.) | 1317 | 1216 | 1286 | 1326 | 1250 | 1326 | 1250 | 1450 | 1410 |

TABLE 1

OPERATING AND PROCESS CONDITIONS FOR BIOMASS WASTE TEST RUNS

| Feedstock | Temp (° F.) | Average Feed Rate (lb/h) | Steam Rate (lb/h) | Steam To Biomass (lb/lb) | Total Feed (lbs) |
|---|---|---|---|---|---|
| Pistachio Shells | 1,317 | 35.5 | 26.0 | 0.7 | 337.0 |
| Pistachio Shells | 1,216 | 30.6 | 31.5 | 1.0 | 115.3 |
| Wood Chips | 1,286 | 22.9 | 31.4 | 1.4 | 205.7 |
| Rice Hulls | 1,326 | 30.8 | 26.0 | 0.8 | 185.5 |
| Recycle Paper Mill Sludge | 1,250 | 17.6 | 36.5 | 2.1 | 118.8 |
| Kraft Mill Sludge Waste | 1,250 | 17.6 | 36.5 | 2.1 | 299.6 |
| RDF (sand bed) | 1,450 | 11.0 | 29.0 | 2.6 | 66.0 |

In another project designed to evaluate the low $NO_x$ potential of natural gas-fired pulse combustors, burners of the present invention were tested in three different configurations: a pulse burner (0.76 to 5.58 million Btu/hr firing rate range) retrofitted to a Cleaver-Brooks boiler and two versions of a pulse combustor from 2 to 9 million Btu/hr including a 72-tube heater/heat exchanger bundle of the type used in the steam-reforming process. In each case, the NO, emissions measured were less than 30 ppm @ 3% $O_2$. Emissions data from a pilot-scale 72-tube heater/heat exchanger bundle that had already accumulated more than 5,000 hours of operation was measured by several instruments and is presented in Table 3.

TABLE 3

EMISSIONS DATA FROM THE 72-TUBE PILOT-SCALE PULSE HEATER TESTS

| | FLUE GAS READINGS | | CORRECTED AT 3% 02 | FLUE READINGS | | CORRECTED AT 3% 02 | FLUE GAS READINGS | | CORRECTED AT 3% 02 |
|---|---|---|---|---|---|---|---|---|---|
| FIRING RATE (Btu/hr) | 02 (%) | NOx (ppm) | NOx (ppm) | 02 (%) | NOx (ppm) | NOx (ppm) | 02 (%) | NOx (ppm) | NOx (ppm) |
| 1.73E+06 | 13.9 | 2 | 5.1 | 13.8 | 6 | 15.0 | 13.6 | 0 | 0 |
| 1.74E+06 | 16.1 | 1 | 3.7 | 16.3 | 0 | 0 | 15.9 | 0 | 0 |

TABLE 3-continued

EMISSIONS DATA FROM THE 72-TUBE PILOT-SCALE PULSE HEATER TESTS

| FIRING RATE (Btu/hr) | FLUE GAS READINGS O2 (%) | FLUE GAS READINGS NOx (ppm) | CORRECTED AT 3% O2 NOx (ppm) | FLUE READINGS O2 (%) | FLUE READINGS NOx (ppm) | CORRECTED AT 3% O2 NOx (ppm) | FLUE GAS READINGS O2 (%) | FLUE GAS READINGS NOx (ppm) | CORRECTED AT 3% O2 NOx (ppm) |
|---|---|---|---|---|---|---|---|---|---|
| 3.39E+06 | 13.4 | 2 | 4.7 | 13.6 | 4 | 9.7 | — | 0 | 0 |
| 3.39E+06 | 14.8 | 1 | 2.9 | 16.7 | 0 | 0 | 16.3 | 0 | 0 |
| 3.39E+06 | 16.5 | 1 | 4.0 | 9.4 | 11 | 17.1 | — | — | — |
| 5.10E+06 | 8.8 | 17 | 25.1 | 8.8 | 22 | 32.5 | — | — | — |
| 5.10E+06 | 11.1 | 14 | 25.1 | — | — | — | 8.6 | 16 | 23.2 |

In general, many types of fuel cells are suitable for use in the present invention, including, but not limited to Polymer Electrolyte Fuel Cells (PEFC), Alkaline Fuel Cells (AFC), Phosphoric Acid Fuel Cells (PAFC), Molten Carbonate Fuel Cells (MCFC), Solid Oxide Fuel Cells (SOFC), etc. The cell operating temperature increases in the above order and ranges from ~150° F. for PEFC, ~200° F. for AFC, ~400° F. for PAFC, ~1200° F. for MCFC, and 1,750° F. for SCFC. The projected power capacities for these cells are: 20 to 250 kW for PEFC, 20 to 100 kW for AFC, 50 to 20,000 kW for PAFC, 300 to 3,000 kW for MCFC, and 300 to 300,000 kW for SCFC.

Figure 2:
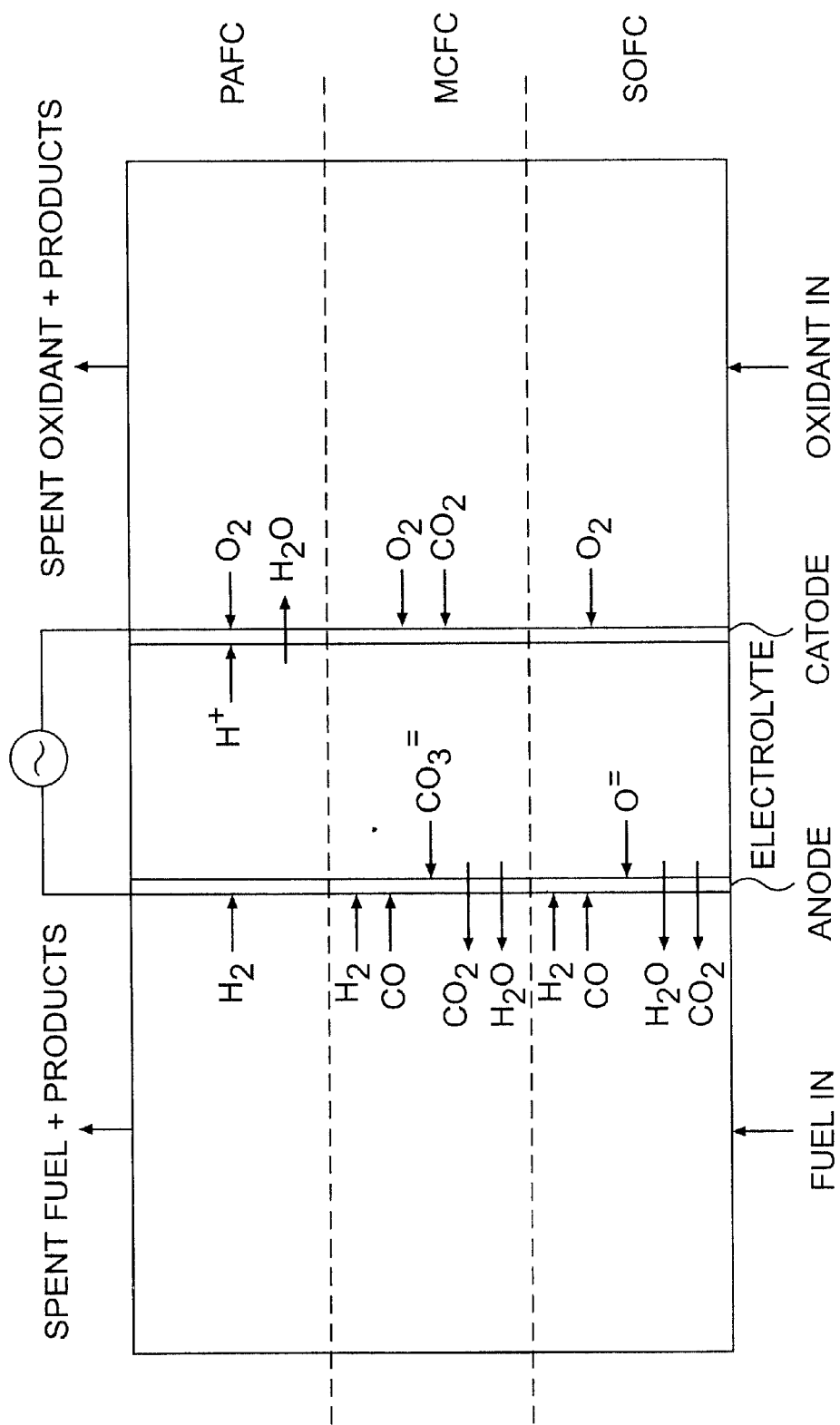
FIG. 2 is a diagram of various fuel cells that may be used in accordance with the present invention.

A simplified representation of a fuel cell is shown in FIG. 2. It shows the ionic flow, ion conduction flow directions, reactants and the products for PAFC, MCFC, and SOFC cell types. The fundamental building block for the fuel cell comprises an electrolyte layer in contact with a porous anode on one side and a porous cathode on the other side.

In the case of the SOFC, the ceramic electrolyte has an oxygen ion void in the lattice that causes the ceramic to become an oxygen ion-conducting electrolyte. In this regard it has similarities to the electron void found in materials used as semi-conductors.

In PAFC, concentrated phosphoric acid is used as the electrolyte. The matrix employed universally to retain the acid is SiC and the electrocatalyst in both anode and cathode is platinum. The anode reaction produces hydrogen ions, which oxidize electrochemically at the cathode to form $H_2O$. The temperature of operation is moderate and is about 200° C. (~400° F.).

In MCFC, the electrolyte is usually a combination of alkali (Na, K) carbonates that is retained in a ceramic matrix of $LiAlO_2$. The electrodes are Nickel (anode) and Nickel oxide (cathode). The cell operates at an elevated temperature of about 650° C. (~1,200° F.) wherein the alkali carbonates form molten salt electrolyte. The cathode reaction produces carbonate ions which oxidize hydrogen and CO electrochemically at the anode to form $H_2O$ and $CO_2$. A source of $CO_2$, however, is required at the cathode to regenerate the carbonate ion. Combusting part of the anode exhaust gas and/or a portion of the fuel gas typically achieves this.

In SOFC, the electrolyte is a solid, non-porous metal oxide and is generally Yittria-stabilized Zirconia. Usually, the cathode is Sr-doped $LaMnO_3$ and the anode is $Ni-ZrO_2$ or $Co-ZrO_2$ cermet. The cell operates at a relatively high temperature of between 800 and 1,000° C. (1,472–1,832° F.). The cathode reaction produces oxygen ions which conduct through the electrolyte and oxidize hydrogen and CO electrochemically at the anode to form $H_2O$ and $CO_2$.

Fuel cells have many positive attributes such as high energy conversion efficiency generally independent of load or size, modularity, minimal emissions, ease of siting, quieter operation, rapid load following and combined heat and power generation potential. However, current fuel cell systems are sensitive to certain fuel contaminants, have high initial cost, and lack consistent long-term reliability and operational lifetime.

Figure 3:
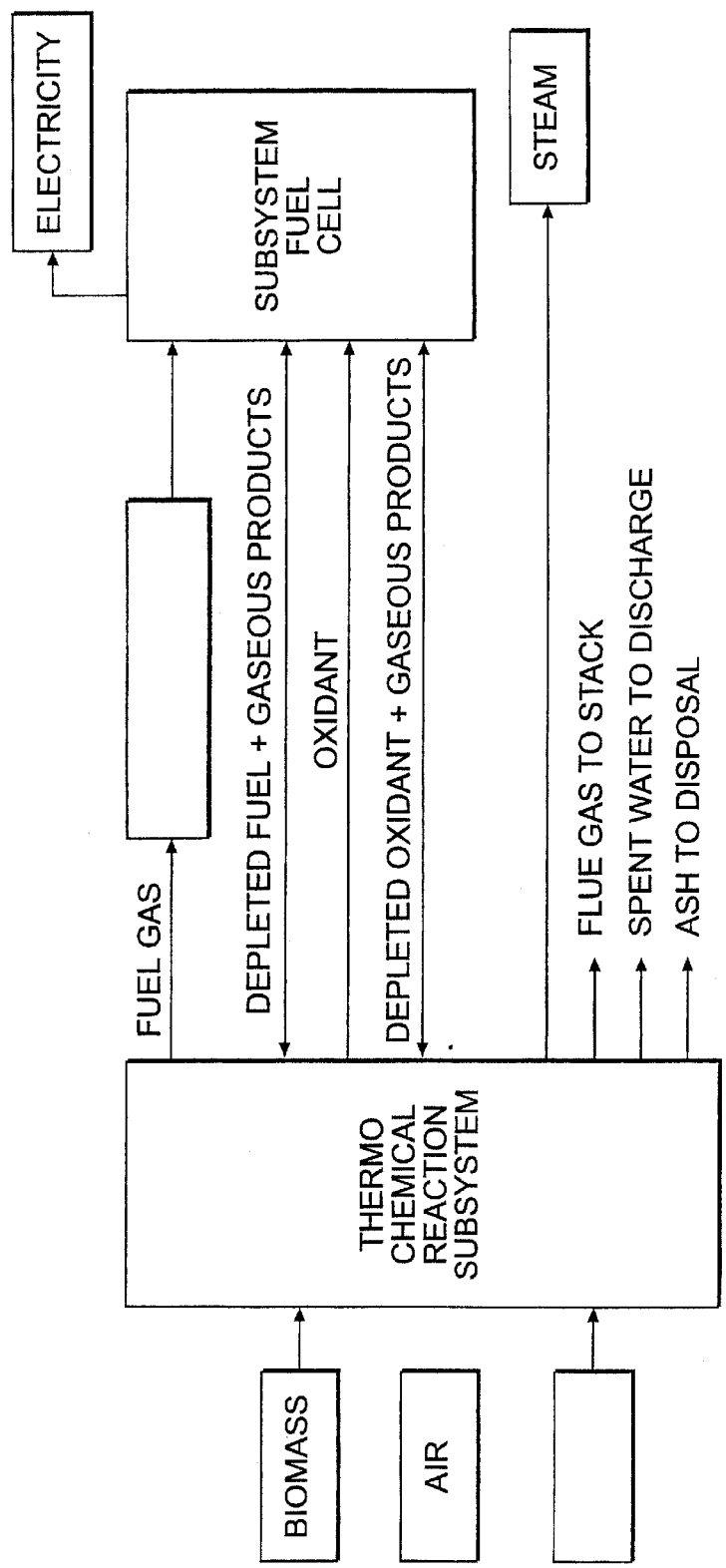
FIG. 3 is a block-flow diagram of a process made in accordance with the present invention.

A simplified block-flow diagram of the proposed concept is shown in FIG. 3. It integrates a thermochemical reaction subsystem with the fuel cell subsystem to generate electricity and steam from biomass. One embodiment of a thermochemical reaction subsystem of the present invention, as depicted in FIG. 3, includes a pulse combustor steam reformer, gas cleanup train, heat recovery steam generator (HRSG), and air heater. Part of the product gas generated by the steam reformer is used in the pulse heaters, while the remainder is sent to the fuel cell subsystem for power generation. If necessary, the fuel gas generated by the steam reformer can also undergo one or more gas polishing and conditioning steps in order to meet the fuel gas cleanliness requirements of the fuel cell.

The embodiment of a fuel cell subsystem depicted in FIG. 3, includes a fuel processor, fuel cell power section, and power conditioner. In general, many types of fuel can be utilized in accordance with the present invention. For example, if hydrogen is the fuel, the fuel processor could simply be a pass-through/delivery device. conversely, if a conventional gaseous fuel (natural gas, proprane, butane, etc.) is used, the fuel processor, for example, could be a sulfur polisher, reformer, shift reactor, particulate filter, and/or burner. The particular fuel cell subsystem package used in the present invention varies with fuel cell type and application.

Generally, any fuel cell type known by one of ordinary skill in the art is suitable for use in the present invention when the fuel is either hydrogen or gaseous fuel. However, each fuel cell has different tolerance levels for other gaseous constituents such as CO, $CH_4$, $CO_2$, $H_2O$, $H_2S$, and COS. For example, most fuel cells have very little or no tolerance for HCl, $NH_3$, HCN, tars, oils, phenols and particulates. Moreover, the functionality of certain fuel cells depends on the purity of the fuel required, presence of diluents that cause a voltage loss, and costs. As such, in preferred embodiments of the present invention, the fuel cell is either a phosphoric acid fuel cell (PAFC), molten carbonate fuel cell (MCFC), solid oxide fuel cell (SOFC), or any combination thereof.

PAFC behaves in a fashion quite similar to PEFC with regard to gas composition. However, it operates at a higher temperature (~400° F.) as compared to PEFC (~150° F.) and this greatly decreases the voltage loss resulting from CO poisoning. Therefore, in some instances, the CO concentration in the fuel gas might be limited to about 0.5% by volume. This corresponds to about 97.5% CO purification efficiency for biomass gasification and is achievable using two or more stages of shift converters (preferably high- and low-temperature conversion). The tolerance for sulfur-containing compounds ($H_2S+COS$) is low and is approximately 50 ppmv. Biomass is typically low in sulfur and, therefore, this target for sulfur can be met.

On the other hand, MCFC operates at a much higher temperature (~1200° F.) than AFC, PEFC and PAFC, and thus can provide the following benefits: CO becomes a fuel and not a poison, common metals can be used to fabricate cells less expensively, nickel catalysts can be used in place of the costly precious metal catalysts, internal reforming can be carried out with catalyst to boost efficiency and the high-temperature exit gas streams permit heat recovery or additional power generation. However, in some instances, MCFC may have a very low tolerance for sulfur (<0.5 ppm) and need $CO_2$ addition at the cathode to form the carbonate ion and requires careful materials selection and design due to the higher operating temperature.

SOFC can also be effective as a fuel cell, because, due to the higher operating temperature (approximately 1800° F.), the presence of CO and $CH_4$ is not generally a detriment to the process, i.e. the compounds are not poisonous and can actually often serve as fuel. Since the electrolyte is a solid, nonporous metal oxide, there is no need for $CO_2$ addition at the cathode as in MCFC. Sulfur tolerance is low and the limit typically is 1 ppm. However, in some instances, it is possible that the high temperature of the SOFC might pose problems with materials selection, sealing, thermal design, and fabrication. Nevertheless, SOFC power generation systems indicate excellent performance, performance stability and cost competitiveness.

Accordingly, a thermoelectrochemical system for biopower generation can offer the ensuing benefits:

- enable the electrification of remote rural areas in the U.S. and in the rest of the world and power rural development;
- enhance the utilization of renewable energy and thereby refrain from aggravating the global climate change;
- provide a "green" technology for markets which have non-fossil mandates;
- cater to power demand, especially in local areas of developing countries which lack premium fuel and have limited biomass supply due to short economical transportation radius;
- aid the disposal of agricultural and livestock wastes and residues in an environmentally, non-intrusive or minimally intrusive manner;
- facilitate the cleanup of areas with radioactive/chemical contamination, meet electrical demand and foster economic growth by gainfully employing phytoremediation and thermoelectrochemical conversion;
- motivate and ease the development of a companion system capable of operating on logistic middle distillate fuels for defense applications including remote radar and communication stations and tactical mobile ground support sites; and
- significantly lower life-cycle maintenance requirements due to fewer moving parts.

Process flow data was generated from one embodiment of a pulse combustor steam reformer of the present invention for hydrocarbon conversion and total carbon conversion together with chemical equilibrium calculations of the steam reforming and shift reactions. As a result, parameters and operating conditions for the particular embodiment were selected.

In the embodiment tested, both cold and hot gas cleanup options were evaluated. Cold gas cleanup can employ conventional commercial technology, while hot gas cleanup can involve hot gas desulfurization and hot gas filtration.

Generally, the requirements for gas polishing and conditioning can vary with fuel cell type and feedstock. In a preferred embodiment, multiple stages of shift reactors are utilized with Phosphoric Acid Fuel Cells (PAFC) for CO conversion because CO poisons the platinum based catalyst. In another preferred embodiment, Molten Carbonate Fuel Cells (MCFC) and Solid Oxide Fuel Cells (SOFC) do not typically utilize shift converters because CO is a directly usable fuel. The tolerance for gaseous impurities such as sulfur compounds ($H_2S$, $CH_3SH$, etc.), halides (HCl, HF, etc.), nitrogen compounds ($NH_3$, HCN, etc.), particulates, higher hydrocarbons ($C_6H_6$, $C_{10}H_8$), etc. and trace metals (As, Pb, Zn, etc.) differs with cell type. Typical tolerance limits for these compounds are on the order of 1 ppm and the degree of gas purification required has been identified and tabulated. Conventional gas cleanup systems (cold or hot) generally drop the impurity level to the range between a few ppm and tenths of a percent. Fuel gas polishing therefore refers to further cleanup or final cleaning to purify the gas. Gas conditioning denotes CO conversion, further methane reformation or $CO_2$ removal to improve compatibility with the anode and enhance fuel utilization at reasonable pressures.

Published data on cell voltage and current density at reference conditions for hydrogen and natural gas as fuel along with published correlations for the different losses due to deviation from reference conditions were compiled for all the three preferred fuel cell types. Process flow sheets were developed for each of the fuel cells and baseline/benchmarking simulations were carried out with hydrogen and natural gas to compare and validate predicted performance (power output, efficiency, cell voltage and power density) against measured performance. The system simulations included chemical equilibrium calculations for external reforming and shift conversion of CO in the case of PAFC and internal reforming in the case of MCFC and SOFC. In each case, substantial agreement was obtained between the predicted and reported results, thus substantially validating the system simulations.

Utilizing this baseline/benchmarking as a foundation, process flow sheets were developed to simulate the preferred thermochemical reactor fuel cell subsystems. Typically, the reformate gas at the exit of the gas cleanup subsystem or at the entrance of the fuel cell is comprised of $H_2$, CO, $CH_4$, $C_2H_6$, $C_2H_4$, $C_3H_6$, $CO_2$, $H_2O$, $H_2S$, $NH_3$ and traces of $CH_3SH$, $(CH_3)_2S$ and $(CH_3)_2S_2$. In some cases, it is possible for the fuel gas to include HCl, $C_3H_8$ and $N_2$. Since the fuel gas at the entrance to the fuel cell generally has a high concentration of hydrogen (50 to 60% by volume), additional external reforming of the fuel was found to be unnecessary in the case of PAFC.

However, the CO concentration must also generally be reduced from a 10 to 20% range to less than 0.5% in the case of some fuel cells, such as for the PAFC fuel cell.

Therefore, in one embodiment of the present invention, two stages (high temperature and low temperature) of shift converters were employed upstream of the PAFC. Internal steam reforming and water gas shift reactions were included for MCFC and SOFC. The reactions were assumed to reach chemical equilibrium for this analysis. The following reactions were included:

Steam Reforming:

$$CH_4 + H_2O \leftrightarrows CO + 3H_2 \quad (2\text{-}1)$$

$$C_2H_6 + 2H_2O \leftrightarrows 2CO + 5H_2 \quad (2\text{-}2)$$

$$C_2H_4 + 2H_2O \leftrightarrows 2CO + 4H_2 \quad (2\text{-}3)$$

$$C_3H_6 + 3H_2O \leftrightarrows 3CO + 6H_2 \quad (2\text{-}4)$$

Water Gas Shift:

$$CO + H_2O \leftrightarrows CO_2 + H_2 \quad (2\text{-}5)$$

If the equilibrium gas composition is denoted as $n_{CH4}$ moles of $CH_4$, $n_{C2H6}$ moles of $C_2H_6$ and so on and the total number of moles is n, then the following equilibrium equations can be written for operation at atmospheric pressure:

$$K_1 = {''}_{CO} n^3{}_{H2}/({''}CH_4 {''}H_2O\ n^2) \quad (2\text{-}6)$$

$$K_2 = n^2{}_{CO} n^5{}_{H2}/({''}C_2H_6 n^2{}_{H2O} n^4) \quad (2\text{-}7)$$

$$K_3 = n^2{}_{CO} {''}H_2{}^4/({''}C_2H_4 n^2{}_{H2O} n^3) \quad (2\text{-}8)$$

$$K_4 = n^3{}_{CO} n^6{}_{H2}/(n_{C3H6} n^3{}_{H2O} n^5) \quad (2\text{-}9)$$

$$K_5 = {''}CO_2 {''}H_2/({''}_{CO} {''}H_2O) \quad (2\text{-}10)$$

The values for $K_i$ (i=1,2 . . . 5), the equilibrium constants, were generated as a function of temperature from the standard relation:

$$K_i = \exp[-DG^0{}_i/RT)] \quad (2\text{-}11)$$

where $G^0{}_i$ is the change in the Gibbs function that would occur if the $i^{th}$ chemical reaction (given by equations 2-1 through 2-5) proceeded completely from left to right, R is the Universal Gas Constant and T is the absolute temperature of the reaction system.

The five equations (2-6 through 2-10) were solved simultaneously and iteratively to determine the equilibrium gas composition utilizing the $K_i$ values generated from equation (2-11).

One of the objectives of the present invention was to minimize the number of unit operations/components but without compromising efficiency, life and reliability. Some of the parameters examined include fuel and oxidant utilization, fuel cell type (PAFC, MCFC and SOFC), feedstock type, feedstock throughput (or system size) and level of integration. Process flow diagrams were generated, pinch analysis was used and materials and energy balances and simulations were performed to select the most appropriate system configuration. Emissions projections were also made.

The engineering methods and computer codes developed for one embodiment of the pulse combustor steam reformer of the present invention, and other empirically developed codes were used to perform component designs for several of the system configurations. Two system sizes have been identified to enable commercialization: (1) One is a 200 kW biomass-fueled (wood) power generator for the market entry in the on-site end-use market. This system would be viable with achievable reductions in stack costs; (2) The second system is in the appropriate size for commercial introduction at essentially current stack costs. This biomass-fueled system is aimed at an area in the pulp and paper industry with considerable market pull with potential for creating a demand for sufficient amount of stacks to cause fuel cells to become commercial.

Systems in the 10 to 200 kW sizes have similar on-site end-use service targets to that of the PAFC ONSI fuel cell system (200 kW fueled by natural gas) where natural gas is not available or the price of natural gas is higher compared with the cost of the available biomass feedstock.

With mass production being a desired objective, the above-mentioned size range for the power generator can further be subdivided into six (6) nominal module sizes: 16 kW, 25 kW, 40 kW, 80 kW, 100 kW and 200 kW. In one embodiment, the design for each is intended to have capacities of ±25% of the nominal module size with minor modifications and changes in operating conditions as shown in Table 4.

TABLE 4

BIOMASS POWER GENERATION MODULE SIZES

| Nominal Size | Low End | High End |
|---|---|---|
| 16 | 12.00 | 20.00 |
| 25 | 18.75 | 31.25 |
| 40 | 30.00 | 50.00 |
| 80 | 60.00 | 100.00 |
| 100 | 75.00 | 125.00 |
| 200 | 150.00 | 250.00 |

Table 4 also delineates the high-end and the low-end nameplate capacities for each module size that would be produced using the same standardized hardware design for the nominal power generator with minor differences. This is intended to cover the range of the small generators in the entire kW target range while relying on standard design and mass production and appliance manufacturing approaches.

Generally, there are two basic system configurations devised for the nominal systems. The first one is for the three smaller system nominal modules. One embodiment of a conceptual design for the smaller units is provided in FIG. 4. This embodiment is intended to be more appliance like and space conscious since in the smaller size range this may be needed. Moreover, this embodiment is also mindful of reductions in heat loss from the steam reformer and of further cost reductions of the system.

Figure 4:
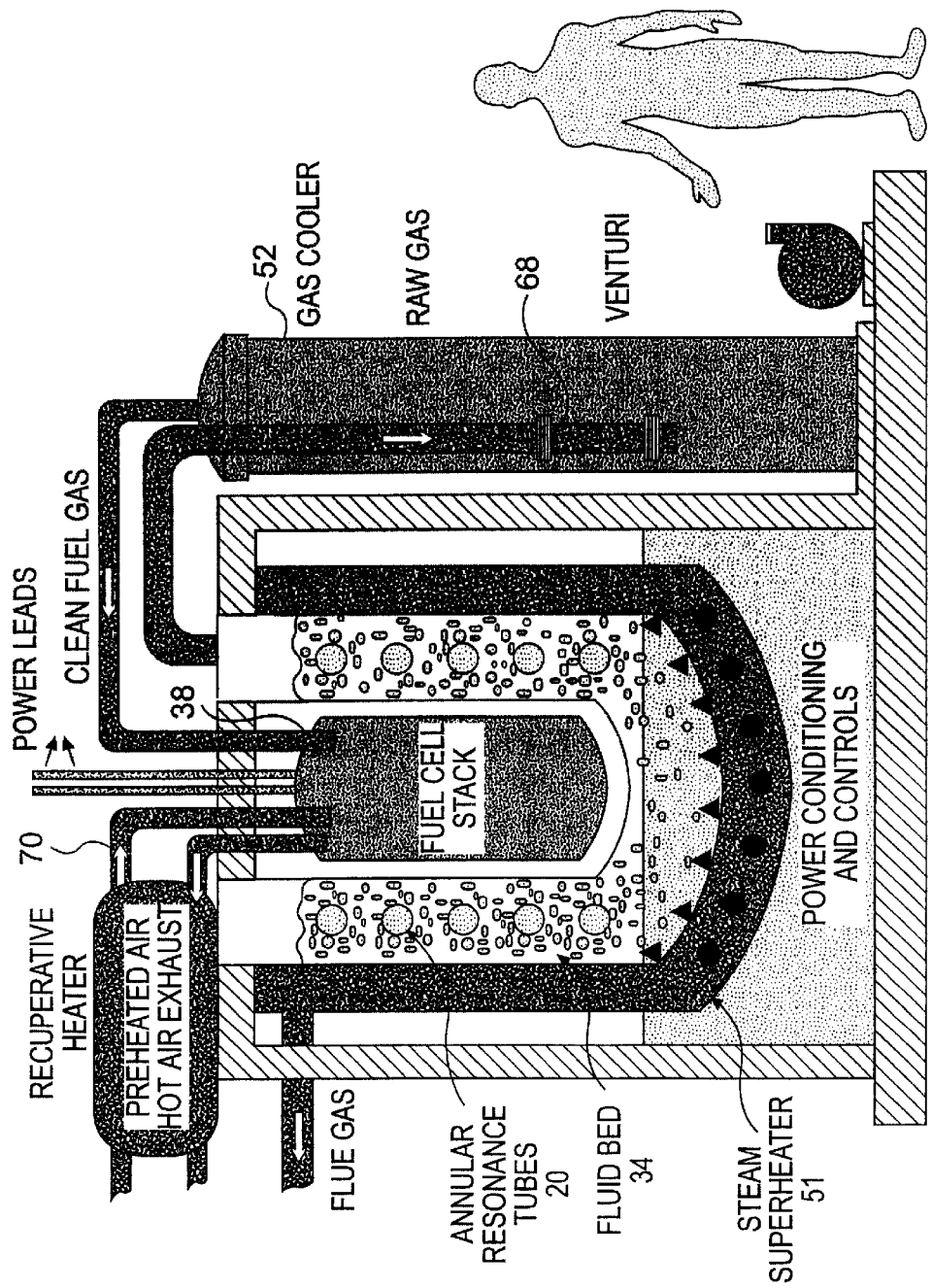
FIG. 4 is a diagram of a compact system for generating electricity in accordance with the present invention.

As shown in FIG. 4, the system includes a fuel cell 38 surrounded by a fluidized bed 34. The fluidized bed is heated by one or more pulse combustion devices. The pulse combustion devices include resonance tubes 20 which indirectly heat the bed. Steam is used as the fluidizing medium which enters the fluidized bed 34 through a steam superheater 51.

In accordance with the present invention, a carbonaceous material is reformed within the fluidized bed 34 producing a product gas. The product gas is fed through a venturi 68 and into a gas cooler 52. From the gas cooler 52, the product gas is delivered to the fuel cell 38 in conjunction with preheated air 70 for producing electricity.

For the nominal size range of 80 kW to 200 kW, another embodiment was employed for the modules. Engineering analyses were also conducted in detail for a nominal 200 kW system.

As described below, a 200 kW on-site system embodiment is provided, followed by an embodiment of a MW sized system. It is preferred that the system be packaged as a self-contained power plant capable of continuous operation. The following are some features of a 200 kW embodiment:

Biomass fuel
24-hour storage capacity
High efficiency (>25%)
Very low emissions (<(1/10)th NSPS)
Alternating current, 60 or 50 Hz Automatic controls Automatic grid connect or disconnect Fail-safe load matching Local operator interface Local diagnostic terminal Remote data acquisition and control Automatic load-following output Modular with transportable modules such that each module is less than 10'×18'×10'

Minimum maintenance

High availability (>95%)

Quiet operation (<75 dB)

Capable of operation at ambient temperature between ~20° F. and 110F. and at site altitudes up to 6,000 ft.

Long life (>25 years)

Compliance with the harmonized Fuel Cell Power Plant Standard Z21.83. CGA12.10.

The tolerance limits of the embodiment for impurities are furnished in Table 5 for the three different fuel cell types.

TABLE 5

TOLERANCE LIMIT FOR IMPURITIES

| | Tolerance Limit (ppmv) | | |
|---|---|---|---|
| Impurity | PAFC | MCFC | SOFC |
| $H_2S$ | <20 | <0.5 | <0.1 |
| $NH_3$ | <1,000 | <10,000 | <5,000 |
| CO | <5,000 | Fuel | Fuel |
| HCl | | <10 | <1 |
| Particulates | | <0.1 g/l | <0.1 g/l |

In general, any carbonaceous material can be used in the systems of the present invention. Particular examples of feed streams include black liquor and wood. The analysis for black liquor is given in Table 6 and that for wood is presented in Table 7.

TABLE 6

BLACK LIQUOR ANALYSIS
Kraft Liquor
Ultimate Analysis

| | Weight %, Dry |
|---|---|
| Carbon | 37.20 |
| Hydrogen | 3.60 |
| Nitrogen | 0.00 |
| Sulfur | 3.70 |
| Chlorine | 0.00 |
| Sodium + Potassium | 21.10 |
| Oxygen | 34.40 |
| HHV, Btu/lb, Dry BLS | 6,175 |
| Black Liquor Solids Content, % | 75.00 |

TABLE 7

BIOMASS ANALYSIS
Wisconsin Maple
Ultimate Analysis

| | Weight %, Dry |
|---|---|
| Carbon | 49.54 |
| Hydrogen | 6.11 |
| Nitrogen | 0.10 |

TABLE 7-continued

BIOMASS ANALYSIS
Wisconsin Maple
Ultimate Analysis

| | Weight %, Dry |
|---|---|
| Sulfur | 0.02 |
| Chlorine | 0.00 |
| Ash | 0.50 |
| Oxygen | 43.73 |
| HHV, Btu/lb, Dry BLS | 8,476 |
| Moisture, %, as received | 38 |

The objective was to select the most appropriate system configuration for small (10 to 200 kW) power generators. The initial analyses were performed on black liquor.

The nominal design parameters employed for the steam reformer design are presented in Table 8.

TABLE 8

NOMINAL DESIGN PARAMETERS
Steam Reformer

| Feedstock | Black Liquor |
|---|---|
| Fluid Bed Temperature, ° F. | 1,120 |
| Freeboard pressure, psig | 7.5 |
| Feed rate, BLS TPH | 2.4 |
| Fluidization Velocity, ft/s | 1.5 |
| Fluidization Medium | Steam |
| Dense Fluid Bed Flow Area, $ft^2$ | 70.7 |
| Number of Pulse Heater Modules | 5 |
| Number of Resonance Tubes/Heater | 72 |

Figure 5:
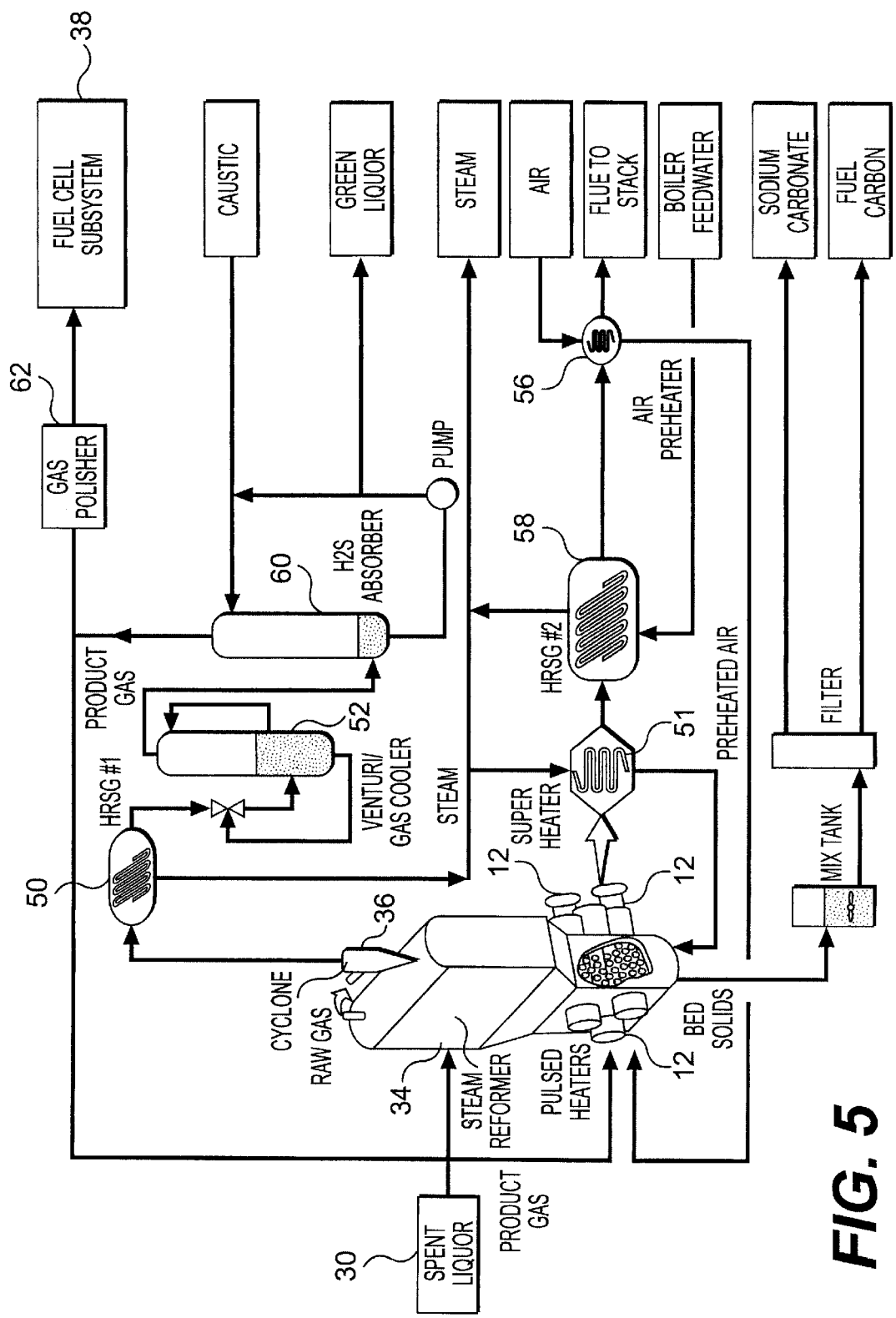
FIG. 5 is a schematic diagram of one embodiment of a process made in accordance with the present invention.

A schematic of one embodiment of a baseline thermo-electrochemical system of the present invention is shown in FIG. 5. This system is unintegrated because the thermochemical subsystem and the fuel cell subsystem are loosely coupled and there is no cross talk. The system, as depicted, comprises the following major subsystems:

Spent liquor handling and feeding subsystem,

Pulse combustor steam reformer,

Fuel gas heat recovery steam generator,

Fuel gas cleanup train containing:
  ø Venturi/gas cooler
  ø $H_2S$ Absorber

Fuel gas polisher

Steam superheater, heat recovery steam generator and air preheater,

Alkali and carbon separation subsystem, and

Fuel cell subsystem.

Referring to FIG. 5, the system of the present invention will now be discussed in detail. Like reference numerals have been used throughout the figures to indicate similar elements. As shown, the system includes a steam reformer including a bubbling fluidized bed 34 fluidized with superheated steam. The steady-state bed can maintain a mean particle size of 250 to 350 microns and can be comprised primarily of alkali carbonate and some residual carbon. Initially, limestone can be used as a one-time start-up bed material during the commissioning of the plant. Superheated fluidization steam can also be supplied to the distribution headers and bubble caps with sufficient pressure drop to maintain uniform fluidization across the cross-section of the vessel.

The fluidized bed 34 is heated by any suitable combustion device and heat exchanger, such as by a plurality of pulse combustion devices 12. As shown, each pulse combustion device contains multiple resonance tubes which extend into the fluidized bed 34. Resonance tubes of the pulsed heater modules serve as efficient sources of heat supply to support the endothermic steam-reforming reaction of the liquor. Moreover, in some embodiments, the resonance tubes of the pulsed heater modules can be mounted perpendicular to the fluidization steam flow to enhance the heat transfer between the resonance tube walls and the fluid-bed particles. Overall, utilization of the pulsed heater normally decreases the required surface area for heat transfer and reduces the size and capital cost of the reformer.

Figure 6:
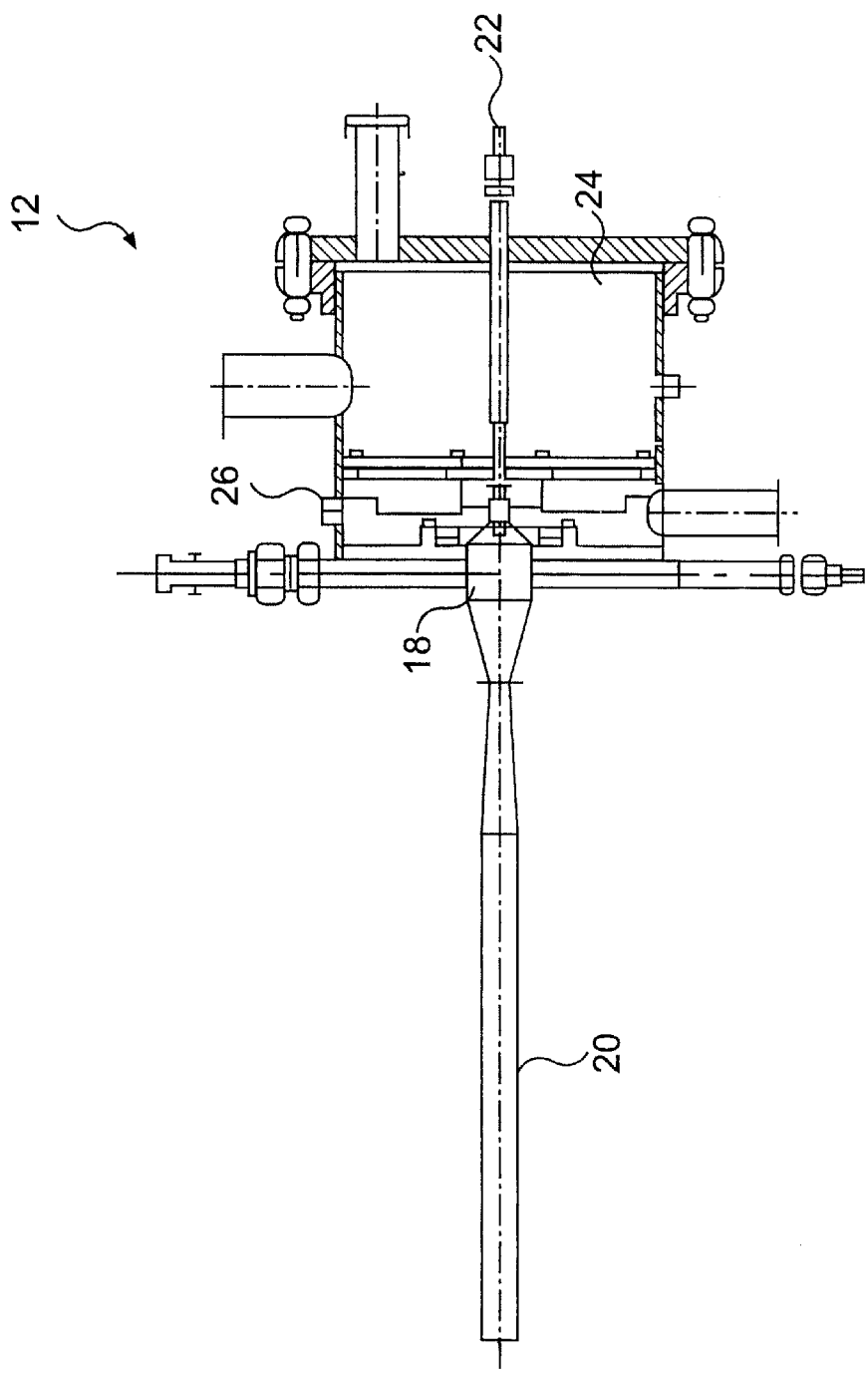
FIG. 6 is a plan view of a pulse combustion device that may be used in the process of the present invention.

Referring to FIG. 6, one embodiment of a pulse combustion device generally 12 is shown. Pulse combustion device 12 includes a combustion chamber 18 in communication with a resonance tube 20. Combustion chamber 18 can be connected to a single resonance tube as shown in FIG. 6 or a plurality of parallel tubes having inlets in separate communication with the pulse combustion chamber as shown in FIG. 5. Fuel and air are fed to combustion chamber 18 via a fuel line 22 and an air plenum 24. Pulse combustion device 12 can burn either a gaseous, a liquid or a solid fuel.

In order to regulate the amount of fuel and air fed to combustion chamber 18, pulse combustion device 12 can include at least one valve 26. Valve 26 is preferably an aerodynamic valve, although a mechanical valve or the like may also be employed.

During operation of the pulse combustion device 12, an appropriate fuel and air mixture passes through valve 26 into combustion chamber 18 and is detonated. During start up, an auxiliary firing device such as a spark plug or pilot burner is provided. Explosion of the fuel mixture causes a sudden increase in volume and evolution of combustion products which pressurizes the combustion chamber. As the hot gas expands, preferential flow in the direction of resonance tube 20 is achieved with significant momentum. A vacuum is then created in combustion chamber 18 due to the inertia of the gases within resonance tube 20. Only a small fraction of exhaust gases are then permitted to return to the combustion chamber, with the balance of the gas exiting the resonance tube. Because the pressure of combustion chamber 18 is then below atmospheric pressure, further air-fuel mixture is drawn into the combustion chamber 18 and auto-ignition takes place. Again, valve 26 thereafter constrains reverse flow, and the cycle begins anew. Once the first cycle is initiated, operation is thereafter self-sustaining.

Pulse combustion devices as described above regulate there own stoichiometry within their ranges of firing without the need for extensive controls to regulate the fuel feed to combustion air mass flow rate ratio. As the fuel feed rate is increased, the strength of the pressure pulsations in the combustion chamber increases, which in turn increases the amount of air aspirated by the aerodynamic valve, thus allowing the combustion device to automatically maintain a substantially constant stoichiometry over its desired firing range.

Pulse combustion device 12 produces a pulsating flow of combustion products and an acoustic pressure wave. In one embodiment, the pulse combustion device produces pressure oscillations or fluctuations in the range of from about 1 psi to about 40 psi and particularly from about 1 psi to about 25 psi peak to peak. These fluctuations are substantially sinusoidal. These pressure fluctuation levels are on the order of a sound pressure range of from about 161 dB to about 194 dB and particularly between about 161 dB and about 194 dB. Generally, pulse combustion device 12 can have an acoustic pressure wave frequency of from about 50 to about 500 Hz and particularly between about 50Hz to about 200 Hz. Generally, the temperature of the combustion products exiting the resonance tube 20 will range from about 1200 degrees F to about 2000 degrees F.

Spent liquor 30 is injected into the reformer via dual-fluid atomizers to provide uniform distribution of the liquor across the cross-section of the bed 34. The liquor injector design can provide a thin film coating of bed particles to enhance reaction rates (high surface-to-mass ratio) and carbon conversion. The steam reformer subsystem may also include a superheater 51 to preheat the fluidization steam before it enters the reformer. The superheater 51 preferably employs a portion of the sensible heat in the pulsed heater flue gas stream to superheat the steam. This reduces the heat load in the reactor, thereby reducing the number of heater modules required for the liquor throughput.

Solids separation and return can be accomplished by any method known in the art. In particular, as shown, one embodiment of the present invention achieves solid separations in the steam reformer subsystem by high efficiency, low maintenance cyclones 36. The designs employed for these components can be similar or identical to those that are used in catalytic crackers. The cyclones 36 efficiently capture small particles and return them to the bed for inventory control and additional reaction.

Upon exiting the particulate cyclones 36, the product gas can be partially recirculated to the bed through a steam eductor, while the bulk of the product gas is processed through a heat recovery steam generator 50 (HRSG #1). The heat absorbed by the water cooling of the pulsed heater tube sheet also contributes to the steam produced in the HRSG #1. Steam from the HSRG #1 supplements the steam generated from the waste heat boiler 58, HRSG #2.

In one embodiment, a portion of the clean product gas can be recycled for firing in the pulsed heaters. The flue gas leaving the superheater is circulated to the boiler 58 (HRSG #2) where steam is generated. Steam is collected in a header and distributed to the steam reformer subsystems as required. Excess steam is exported to the mill.

In general, the function of the alkali extraction and recovery subsystem is to extract and recover both the alkali and the residual fuel value from the reformer bed solids. The alkalis report to the bed as dry carbonates. Unreacted carbon and Non-Process Elements (NPES) also report to the bed as insoluble components. Washing and filtering of the bed solids accomplish the separation of the alkali from the insolubles. Countercurrent washing is used to maximize the recovery of alkali. The wash water contains weak alkali value and is recycled to the mix tank. The alkali extraction system supplies scrubbing medium to the $H_2S$ absorber and exports the balance of alkali to the mill in the form of a clear sodium carbonate solution for cooking.

Another export stream is the fuel carbon in the form of a filter cake that can be burned to raise steam. The filter cake may also be used as an activated carbon filtration medium in the wastewater treatment facility, if so desired.

The general function of the gas cleanup subsystem is to remove entrained particulate matter and $H_2S$ from the product gas.

Following the HSRG #1, the gas can be quenched, saturated with water and scrubbed of particulate matter when contacted with recirculated fluid in a high-energy venturi 52. A bleed stream containing condensed organics can then be discharged to the mill's sewer. The gas can then be further cooled by countercurrent contact with recirculated liquor in a packed tower. The recirculated liquid can be cooled in a non-contact heat exchanger. A bleed stream containing condensed organics is discharged to the mill's sewer. Final scrubbing occurs in a countercurrent absorber 60 with caustic to remove $H_2S$ from the product gas. The resulting sodium hydrosulfide solution is returned to the Mill's cooking liquor storage tank.

The general function of a gas polisher 62 is to further purify the fuel gas so that the impurities are within the tolerance limits for the fuel cell (see Table 5). There are several processes available for gas purification. In one embodiment, low-temperature adsorption would be advantageous for the operating conditions of this system. Several sorbents are again available. These include activated carbon, molecular sieves, regenerable sorbent developed at the Federal Energy Technology Center, activated alumina, etc.

One embodiment of a fuel cell subsystem 38 of the present invention includes a gas conditioning unit (such as shift reactors in the case of the PAFC), fuel cell (PAFC, MCFC or SOFC), power section and power conditioner. The power conditioner converts DC power to AC power. The fuel gas composition is given in Table 9. The component values are listed for the stream leaving the gas cleanup train/entering the polisher and for the stream exiting the polisher/entering the fuel cell. The specifications for the polisher are set such that the impurity levels in the purified stream are within the tolerance limits indicated in Table 5.

TABLE 9

FUEL GAS COMPOSITION
Black Liquor

| Component | Before Polisher (Volume %) | After Polisher (Volume %) |
|---|---|---|
| $H_2$ | 59.21 | 59.21 |
| CO | 9.41 | 9.41 |
| $CO_2$ | 20.65 | 20.65 |
| $H_2O$ | 9.56 | 9.56 |
| $N_2$ | 0.00 | 0.00 |
| $CH_4$ | 1.03 | 1.03 |
| $C_2H_4$ | 0.06 | 0.06 |
| $C_2H_6$ | 0.05 | 0.05 |
| $C_3H_6$ | 0.01 | 0.01 |
| $C_3H_8$ | 0.00 | 0.00 |
| $NH_3$ | 0.00 | 0.00 |
| $H_2S$ | 0.01 | <0.1 ppm |
| HHV, Btu/scf | 235 | 235 |

Figure 7:
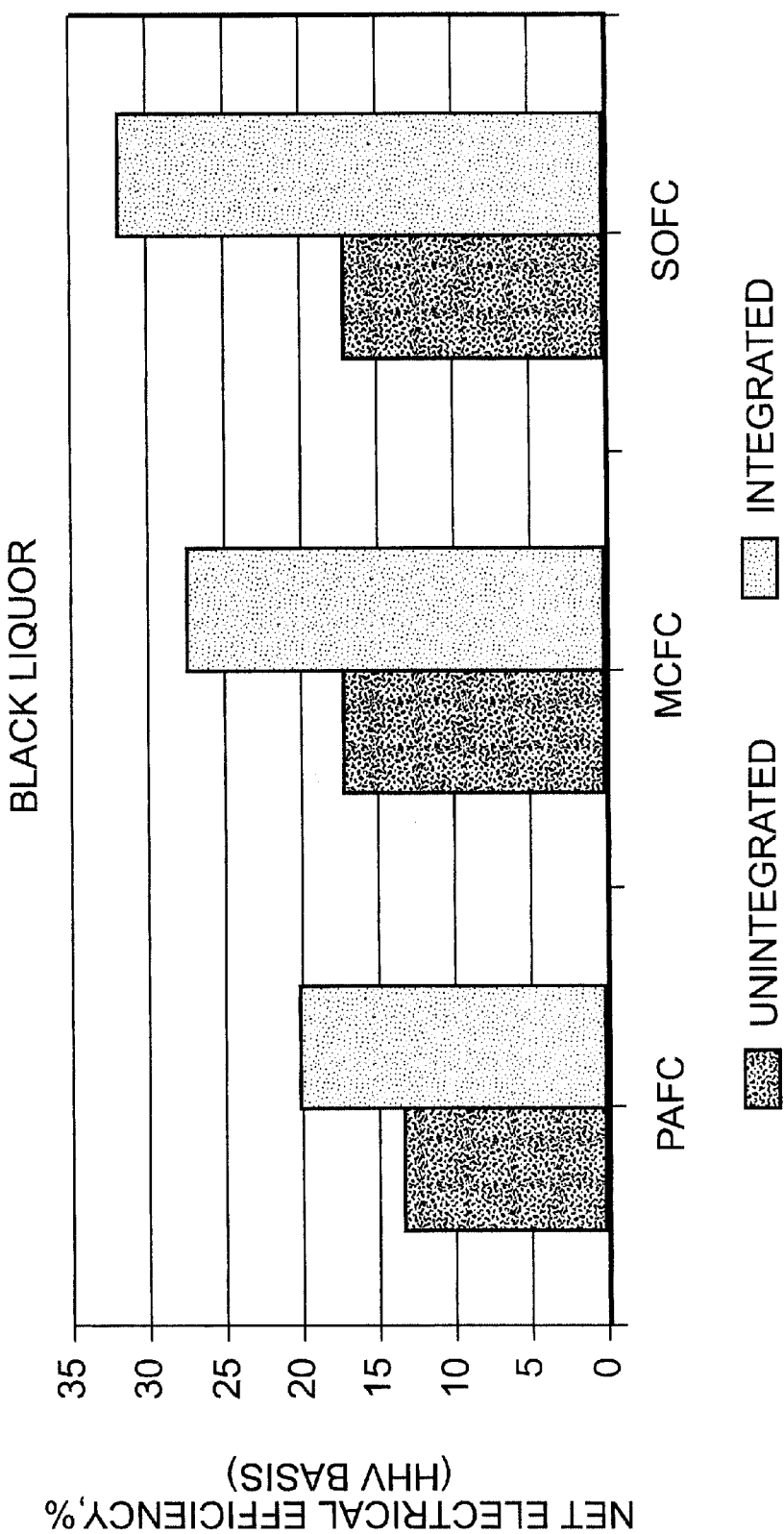
FIG. 7 is a graph illustrating electrical efficiencies of systems made in accordance with the present invention.

The net electrical efficiency computed for the preferred embodiments of the system of the present invention, with the three different fuel cells (PAFC, MCFC and SOFC), are shown in FIG. 7. Equations based on pubic information were used to apply corrections to the cell voltage. The PAFC operates at the lowest temperature of the three cells and requires gas conditioning (high temperature and low temperature shift conversion). Therefore, the efficiency is the lowest with PAFC.

Attempts were then made to improve the performance of the total systems by suitable integration of the thermochemical subsystem with the fuel cell subsystem. Each preferred fuel cell type has unique requirements as discussed above and, therefore, the scheme utilized for process and thermal integration differed with cell type. The optimum configurations determined for the preferred three cell types are presented in FIGS. 8 through 10.

Figure 11:
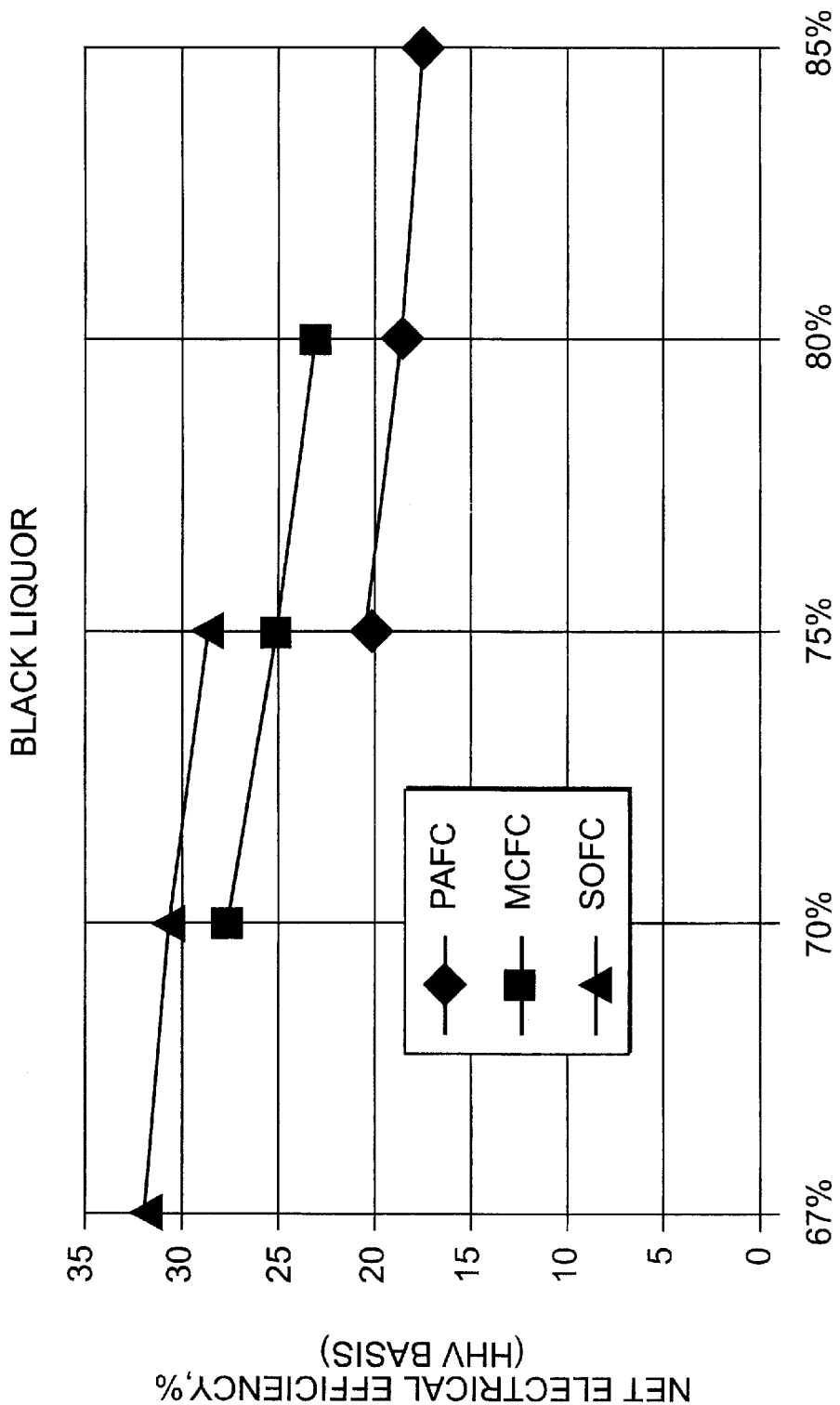
FIG. 11 is a graph illustrating the net electrical efficiency of various systems made in accordance with the present invention.

In the case of PAFC (FIG. 8), the anode exhaust gas is co-fired in the pulse heater 12, the cathode exhaust gas is routed to the air preheater 56 and steam from the superheater 51 is supplied to shift reactors 64 to promote CO conversion to hydrogen. The effect of variation in fuel utilization on net electrical efficiency is shown in FIG. 11. The efficiency improves with a decrease in fuel utilization. The normal fuel utilization in PAFC is about 85 percent. The improvement with a reduction in fuel utilization stems from:

More of the fuel gas generated in the steam reformer flows through the gas polisher and shift reactors, thereby increasing the hydrogen partial pressure in the cell and the power output, and Spent anode gas provides diluent such as $CO_2$ and helps reduce the excess air level in the pulse combustor and in turn the air flow through the combustor. This raises the proportion of the heat supplied from the pulse heater to the steam reformer followed by a reduction in the required firing rate for a given heat duty or liquor throughput.

A 15 percent excess air level was set as the minimum for complete combustion and reduced emissions from the pulse combustor. This prevented further decrease in fuel utilization below 75 percent. As FIG. 7 indicates, the performance of the integrated system is significantly better than that of the baseline system. The efficiency is seen to improve by about 50 percent over the baseline value.

Figure 9:
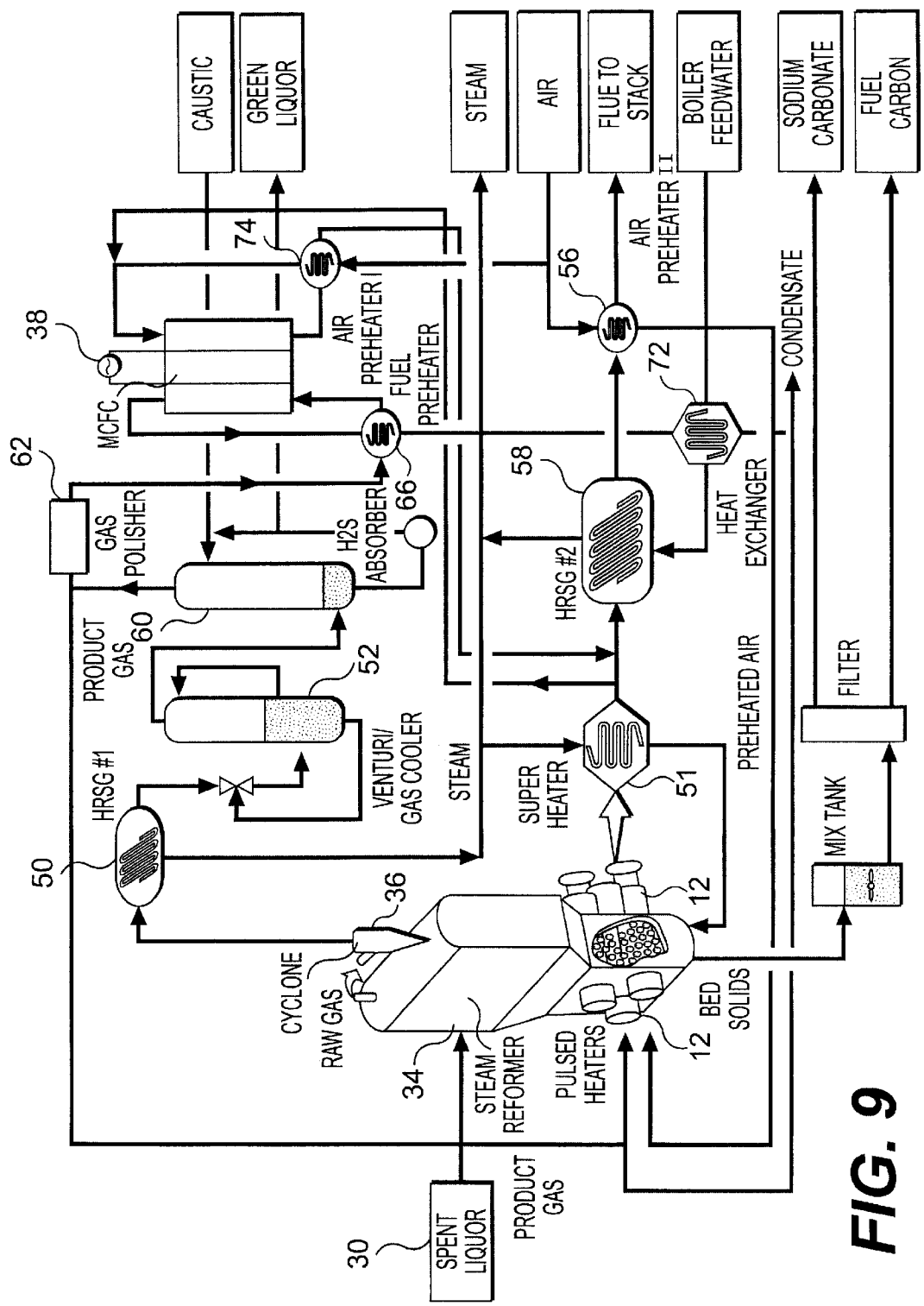
FIG. 9 is another alternative embodiment of a schematic diagram of a process made in accordance with the present invention.

FIG. 9 shows the preferred integrated embodiment that employs MCFC. Here the scheme is a little more complicated even though no shift reactors are needed. The anode exhaust gas is again co-fired in the pulse heater 12 but after heat exchange with the anode supply gas in a fuel preheater 66 and after partial condensation of moisture in a boiler feedwater heater 72. The latter step is incorporated to reduce the water vapor content of the anode spent gas, boost adiabatic flame temperature of the mixture fired in the pulse combustor and recover energy.

In all the cases (FIGS. 8–10), the product gas and spent anode gas firing in the pulse combustor 12 are regulated while keeping the excess air level at or above 15 percent so that the adiabatic flame temperature exceeds 3,000° F. This is to ensure good combustion and robust acoustics (sound pressure level >170 dB).

To cater to the $CO_2$ required in the oxidant stream of the MCFC, the anode exhaust gas or fresh fuel is typically combusted superstoichiometrically. Here, a portion of the pulse combustor flue gas exiting the superheater 51 is blended with preheated air from an Air Preheater I 74 to satisfy the $CO_2$ and $O_2$ demand. This avoids the need for an additional burner with attendant cost saving and emissions reduction. The cathode exhaust gas is first routed to the Air Preheater I 74 to preheat the air supplied to the cathode and then to the HRSG #2. Again, the net electrical efficiency increases with a decrease in fuel utilization (see FIG. 11). In this analysis, internal reforming was accounted for and the $CO_2$ and $O_2$ utilizations were clamped at 75 and 50 percent, respectively. The electrical efficiency improves here for the same reasons as those stated in the case of the PAFC. Finally, the integrated system shows a gain in efficiency of about 60 percent over that of the baseline system (see FIG. 7).

Figure 10:
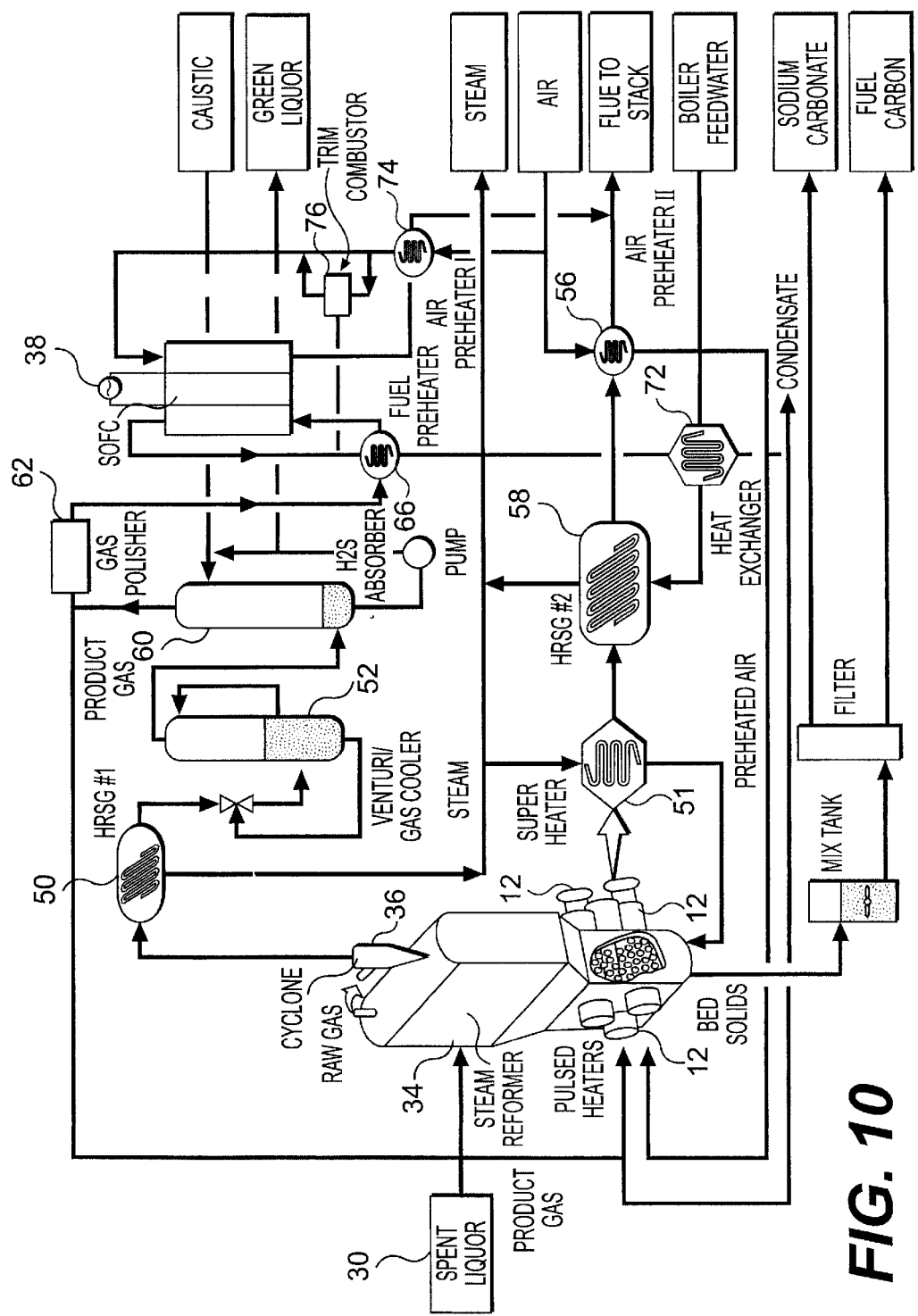
FIG. 10 is another alternative embodiment of a schematic diagram of a process made in accordance with the present invention.

The preferred integrated embodiment based on SOFC is shown in FIG. 10. The anode gas streams are handled in the same manner as in the previous embodiment (FIG. 9). The cathode side incorporates recuperation with trim combustion to maximize performance. Due to oxygen ion transfer, the cathode exhaust gas flow is lower than that at the inlet. Therefore, a slipstream from the anode-spent gas is used in a trim combustor 76 to boost the temperature of the cathode air supply. The analysis indicated the slipstream gas flow to range between 3 and 6 percent of the anode spent gas. Therefore, an external trim combustor 76 may not be needed and the cell operating conditions (flow rates and pressure) could be adjusted to control the extent of gas leakage.

Due to the recuperation arrangement and the presence of diluent such as $CO_2$ in the fuel gas, the oxidant utilization is higher (~50%) than that typical of tubular SOFC (~25%). Here too, the net electrical efficiency improves as the fuel utilization is decreased. The optimum fuel utilization was determined to be about 67%.

The preferred integrated system based on SOFC (see FIG. 10) shows the highest electrical efficiency of all the configurations examined (see FIG. 11). The net electrical efficiency was 31.8% for a 2.4 tonne/h black liquor throughput (i.e. a small size) unit. There is a boost on the order of 85% in efficiency in comparison to that of the baseline.

Figure 8:
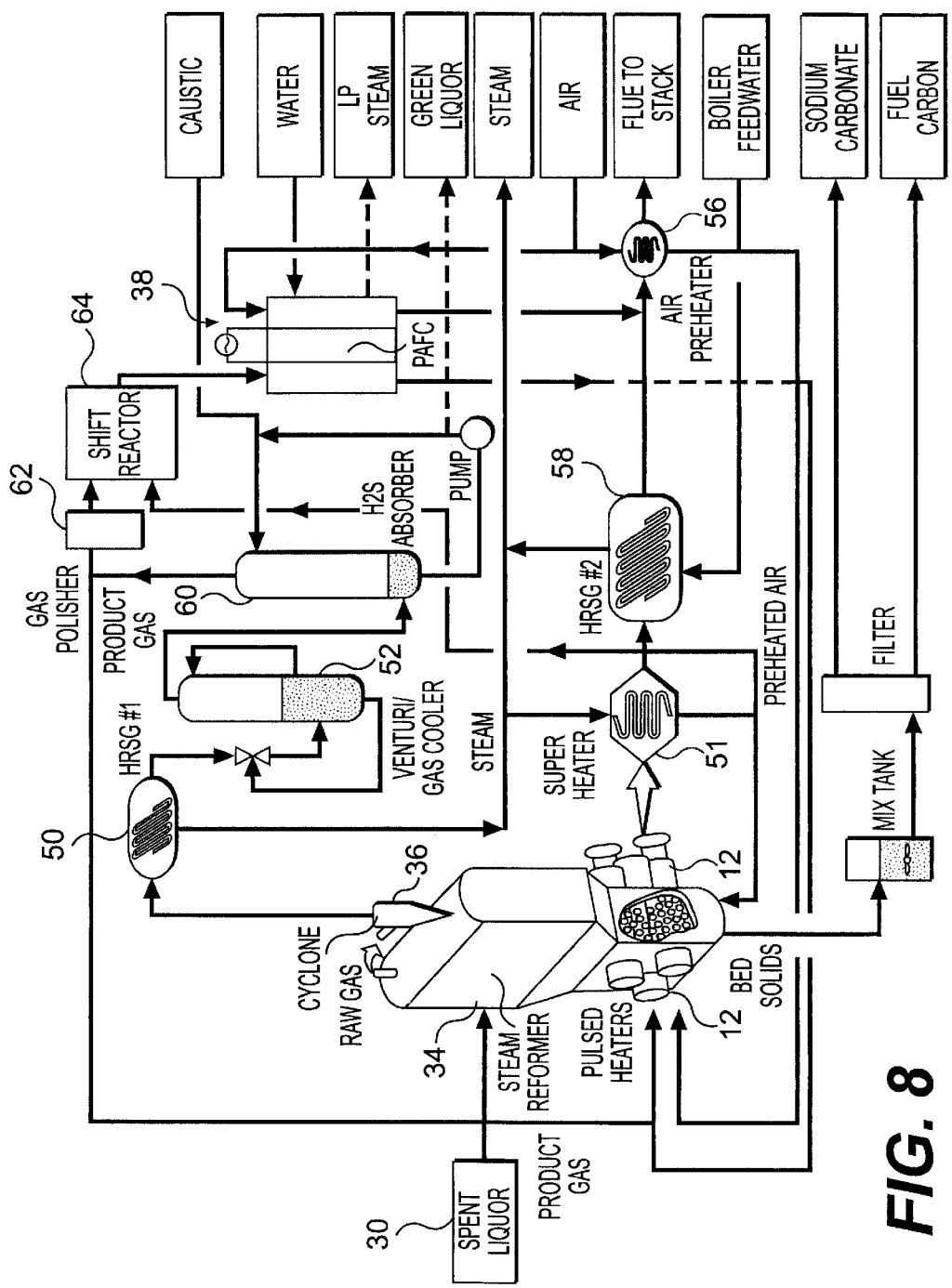
FIG. 8 is a schematic diagram of an alternative embodiment of a process made in accordance with the present invention.
Figure 12:
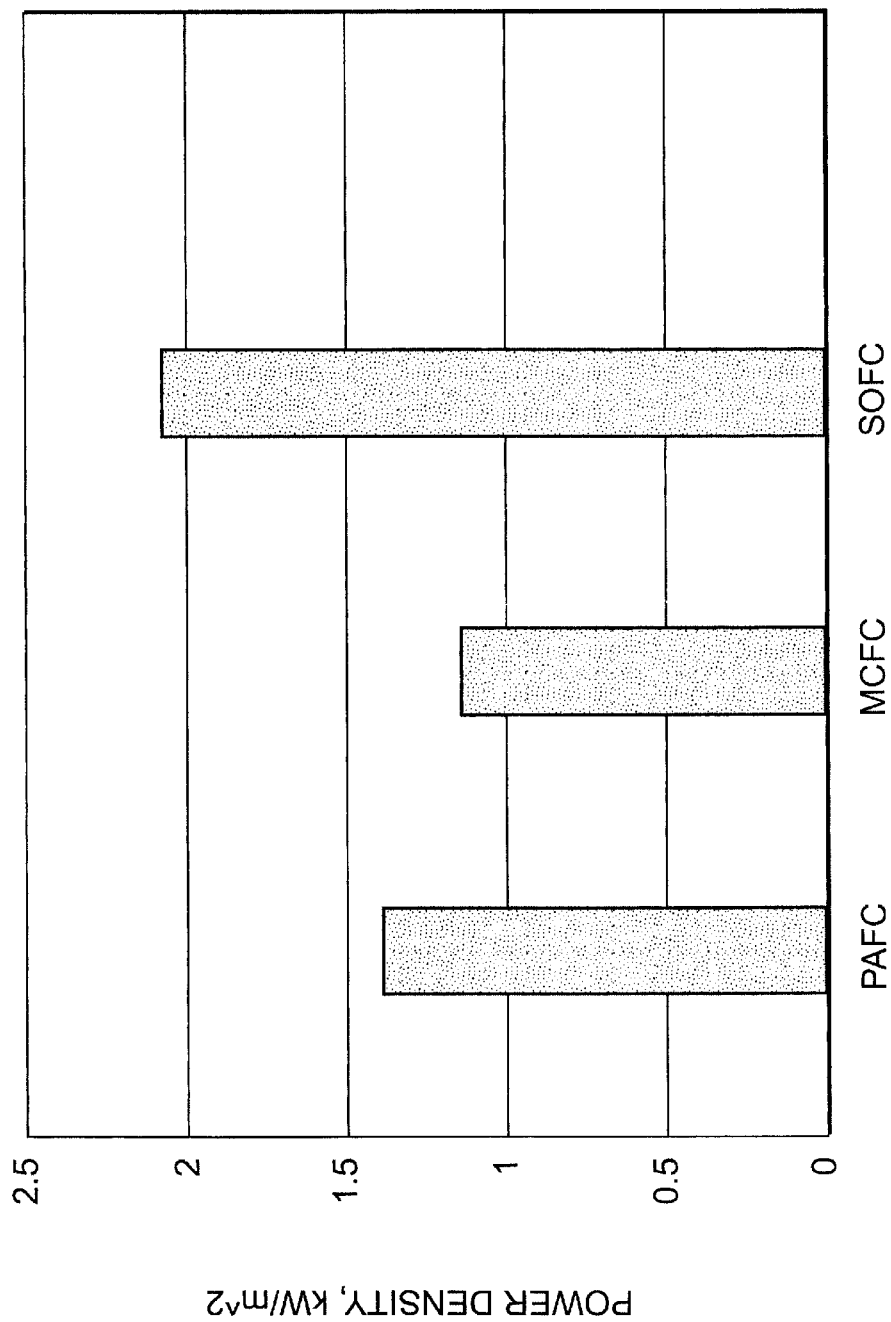
FIG. 12 is a graph illustrating power density of various systems made in accordance with the present invention.

The fuel cell power densities for the three preferred cell types are compared in FIG. 12 based on the configurations shown in FIGS. 8–10. The SOFC exhibits the highest power density of the three cell types.

Figure 13:
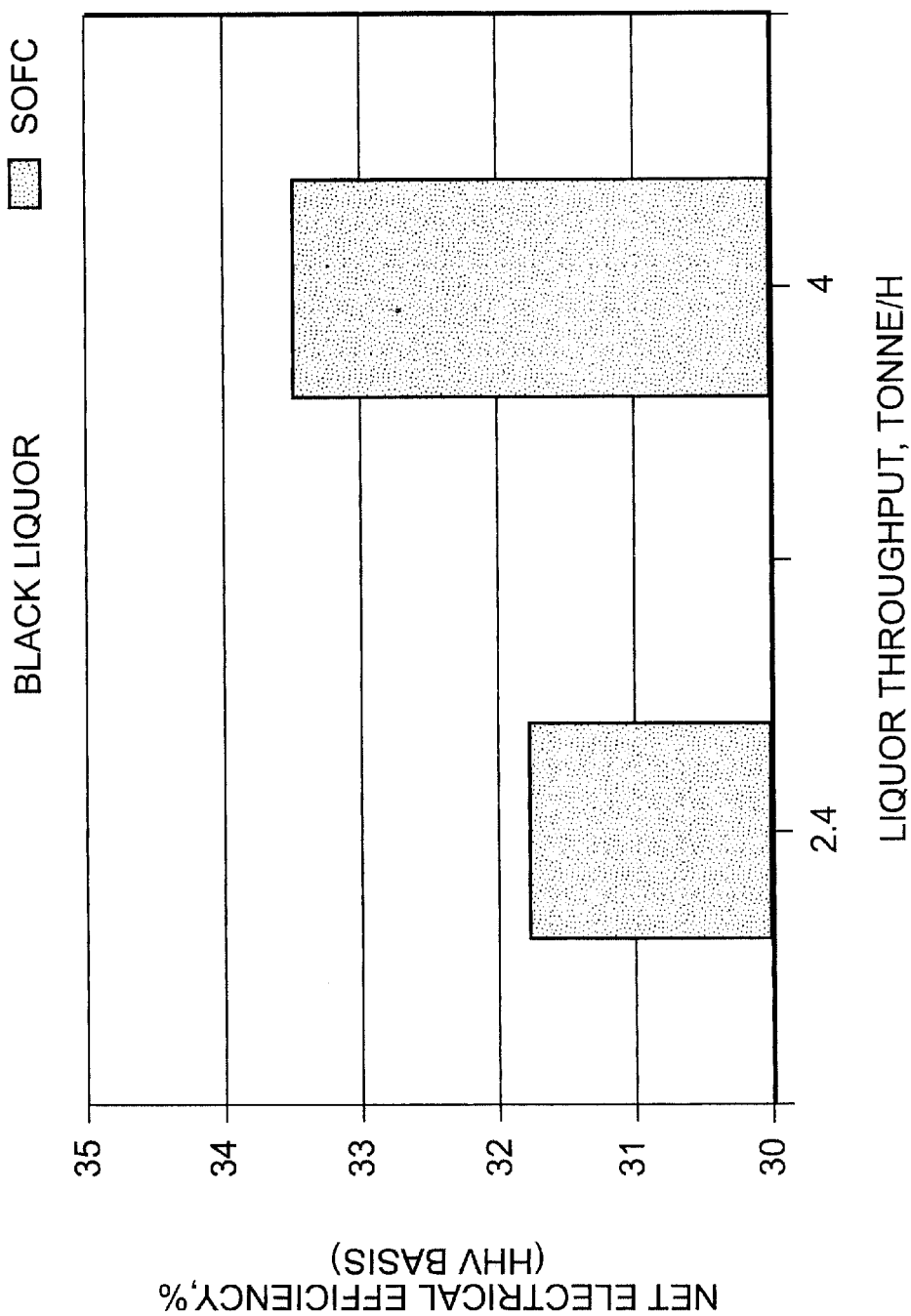
FIG. 13 is a graph illustrating net electrical efficiency of various systems made in accordance with the present invention.

In general, typical U.S. pulp mill is quite large and the smallest incremental capacity would be on the order of 4 tonnes/h black liquor solids throughput. Therefore, a process flow analysis was carried out for this size unit using the SR-SOFC platform. The net electrical efficiency values for the two unit sizes are compared in FIG. 13. The larger capacity system exhibits a higher efficiency due to relatively lower heat losses on account of reduced surface area-to-volume ratio. The 4 tonne/h steam reformer required 8 pulse heater modules.

Analyses similar to those for the black liquor were carried out with wood as the feedstock. The wood used was Wisconsin Maple. For elemental analysis see Table 7.

The parameters for one embodiment of a pulse combustor steam reformer of the present invention are furnished in Table 10.

TABLE 10

NOMINAL DESIGN PARAMETERS
Steam Reformer

| Feedstock | Wood |
|---|---|
| Fluid Bed Temperature, ° F. | 1,475 |
| Freeboard pressure, psig | 7.5 |
| Feed rate, dry TPH | 2.38 |
| Fluidization Velocity, ft/s | 1.75 |
| Fluidization Medium | Steam |
| Dense Fluid Bed Flow Area, $ft^2$ | 70.7 |
| Number of Pulse Heater Modules | 5 |
| Number of Resonance Tubes/Heater | 72 |

The fluid-bed temperature is higher and the fluidization velocity is also higher than those for black liquor. In the case of black liquor, the build-up in the bed acts as the catalyst for steam reforming of carbon even at the low operating temperature of 1,120° F. and results in high total carbon conversion (~99%). Of course, the temperature needs to be lower in the case of black liquor to avoid the formation of smelt in the bed for this could cause fouling of the tubes and also defluidization. Since there is no built-in catalyst, the bed temperature needs to be higher (~1,475° F.) for wood to achieve high carbon conversion.

Experimental data indicate a total carbon conversion of about 98 percent in the 1,450° F. to 1,500° F. temperature range. Some biomass feedstocks such as switch grass contain a higher proportion of alkali (sodium and potassium) and this may lead to the formation of eutectics or low-melting compounds and bed agglomeration and defluidization. To minimize this, the bed material can be varied. For example, the bed material can be alumina instead of sand (to minimize the formation of silicates), thereby also increasing the fluidization velocity to approximately 1.75 ft/s. Design calculations for one embodiment indicated that the nominal wood throughput will be 2.38 dry tonnes/h for a five 72-tube configuration.

Figure 14:
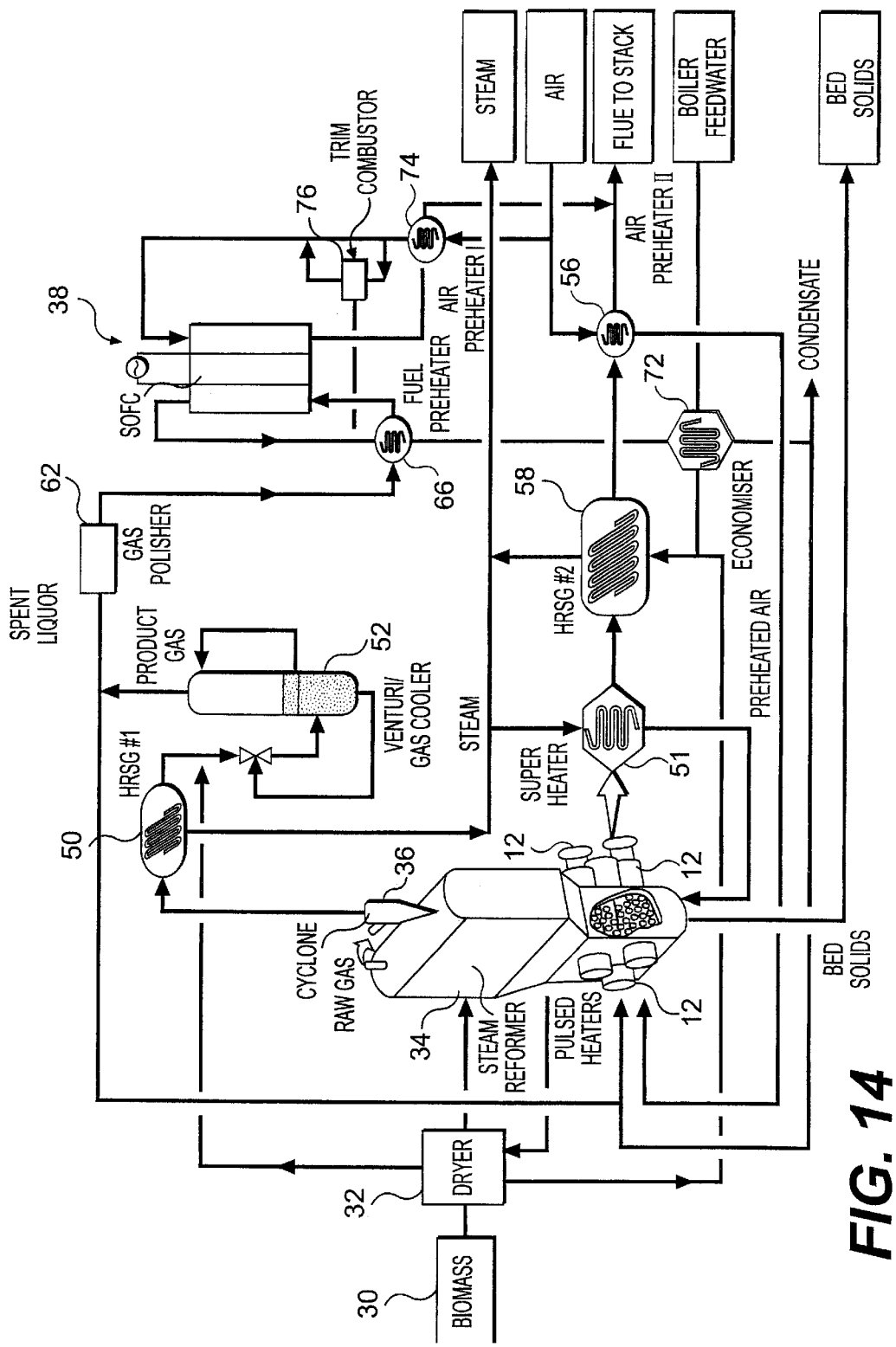
FIG. 14 is another alternative embodiment of a schematic diagram of a process made in accordance with the present invention.

The schematic of one embodiment of an integrated thermo-electrochemical system (200 kW) based on SOFC is shown in FIG. 14 for wood feed. Based on the analyses for black liquor, the thermoelectrochemical system configured with the SOFC was selected for this application. The differences from FIG. 10 are:

Inclusion of a dryer 32 (indirect drying using steam) to reduce the moisture content of the feed from 38% to 6%, and Exclusion of the $H_2S$ absorber due to the trace quantity of sulfur in the wood. The fuel gas compositions after the gas cleanup train and after the polisher are presented in Table 11.

TABLE 11

FUEL GAS COMPOSITION
Wood

| Component | Before Polisher (Volume %) | After Polisher (Volume %) |
|---|---|---|
| $H_2$ | 50.58 | 50.58 |
| CO | 21.37 | 21.37 |
| $CO_2$ | 15.90 | 15.90 |
| $H_2O$ | 9.44 | 9.44 |
| $N_2$ | 0.00 | 0.00 |
| $CH_4$ | 2.26 | 2.26 |
| $C_2H_4$ | 0.29 | 0.29 |
| $C_2H_6$ | 0.07 | 0.07 |
| $C_3H_6$ | 0.02 | 0.02 |
| $C_3H_8$ | 0.00 | 0.00 |
| $NH_3$ | 0.07 | <0.5 ppm |
| $H_2S$ | 0.00 | 0.00 |
| HHV, Btu/scf | 262 | 262 |

Figure 15:
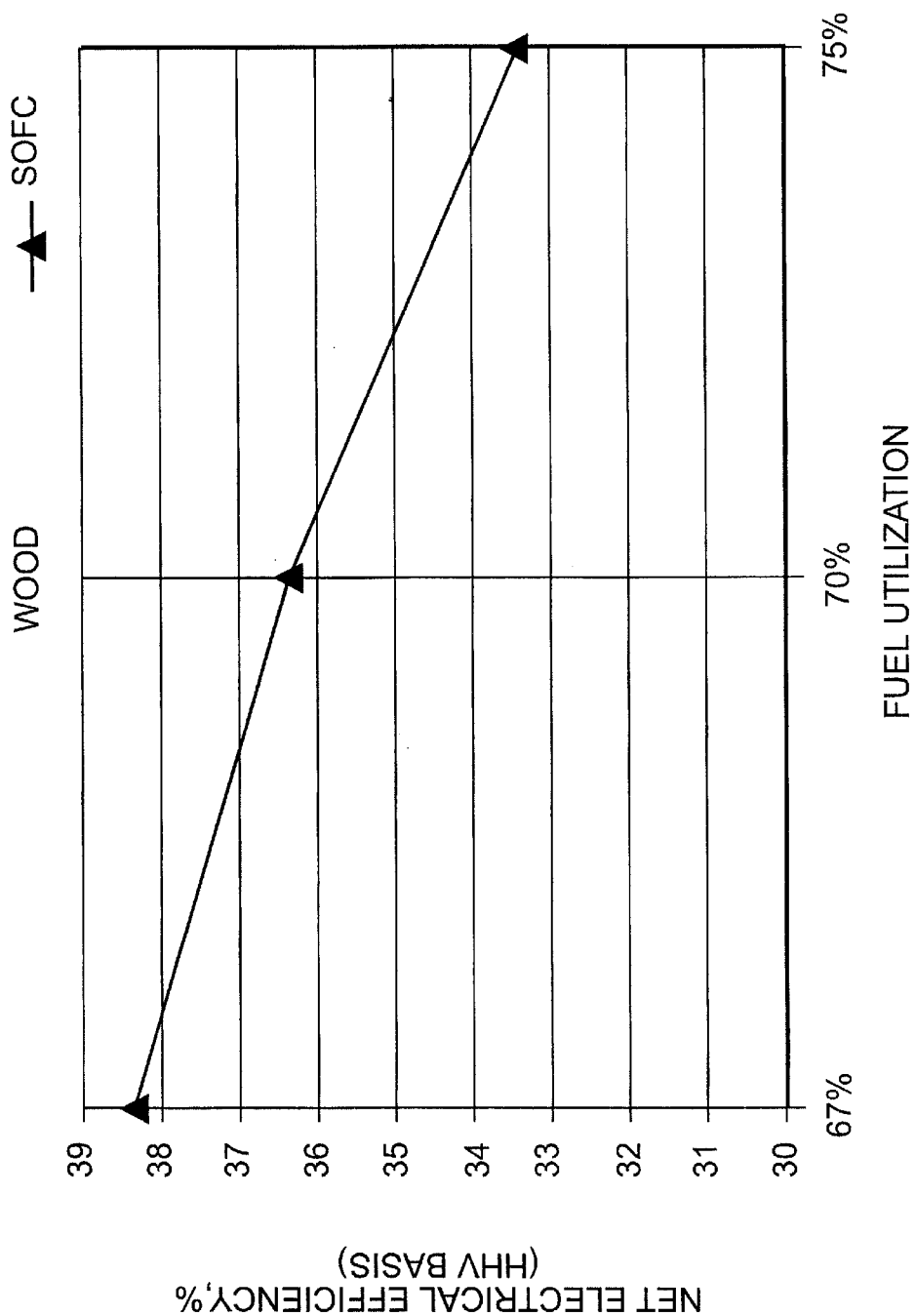
FIG. 15 is a graph showing the net electrical efficiency of a system made in accordance with the present invention.
Figure 16:
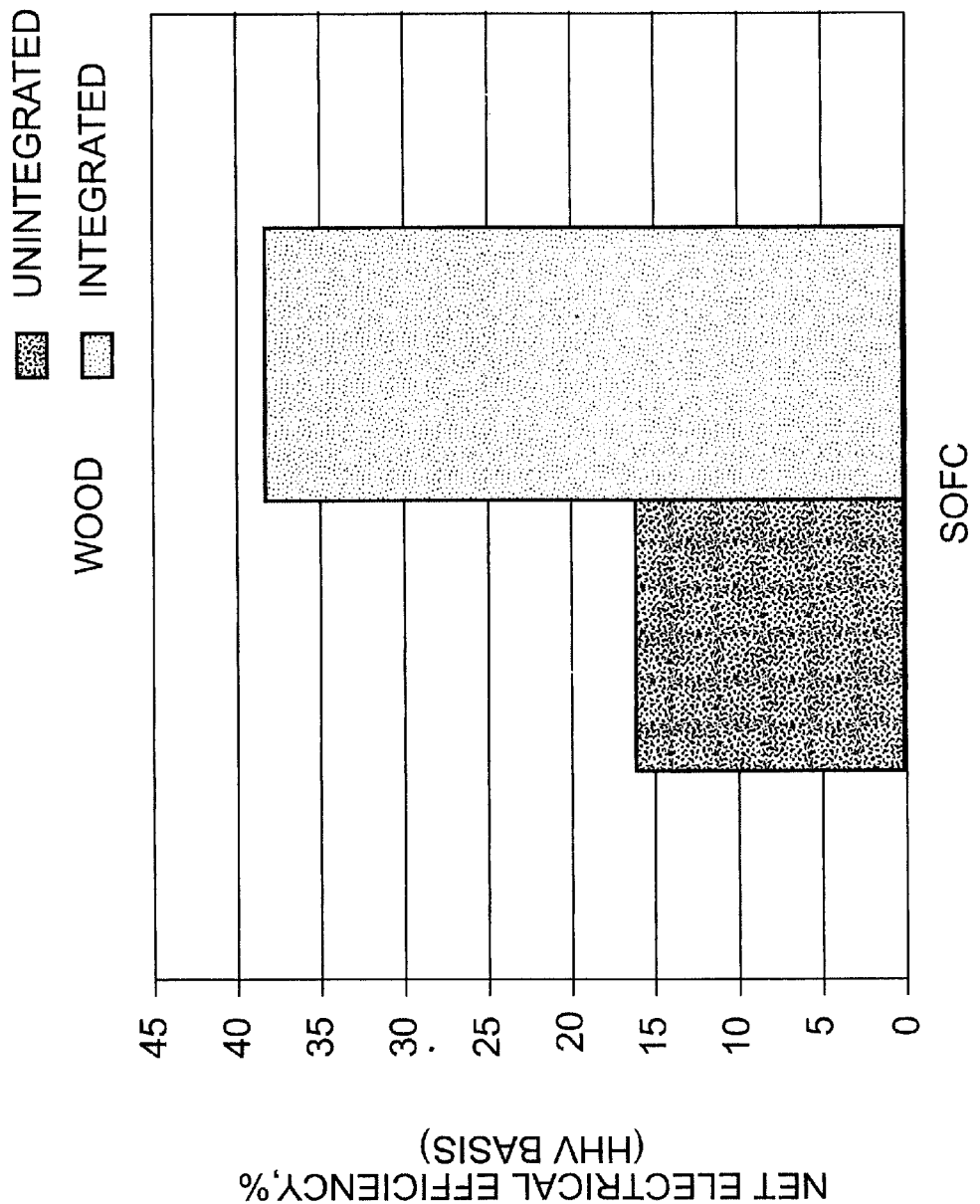
FIG. 16 is a graph showing the net electrical efficiency of various systems made in accordance with the present invention.

Here ammonia is the main impurity. An appropriate sorbent can be selected for removing the ammonia. The sulfur compounds do not present a problem. The variation in net electrical efficiency with fuel utilization is shown in FIG. 15. Again, the optimum fuel utilization was found to be about 67 percent. The effect of system integration is indicated in FIG. 16. The efficiency more than doubles due to integration. The overall efficiency is higher here than in black liquor due to lower ratio of endothermic heat of reaction to heating value for wood, lower moisture content of the feed to the steam reformer (6% vs. 25% for black liquor) and in turn higher cold gas efficiency.

Figure 17:
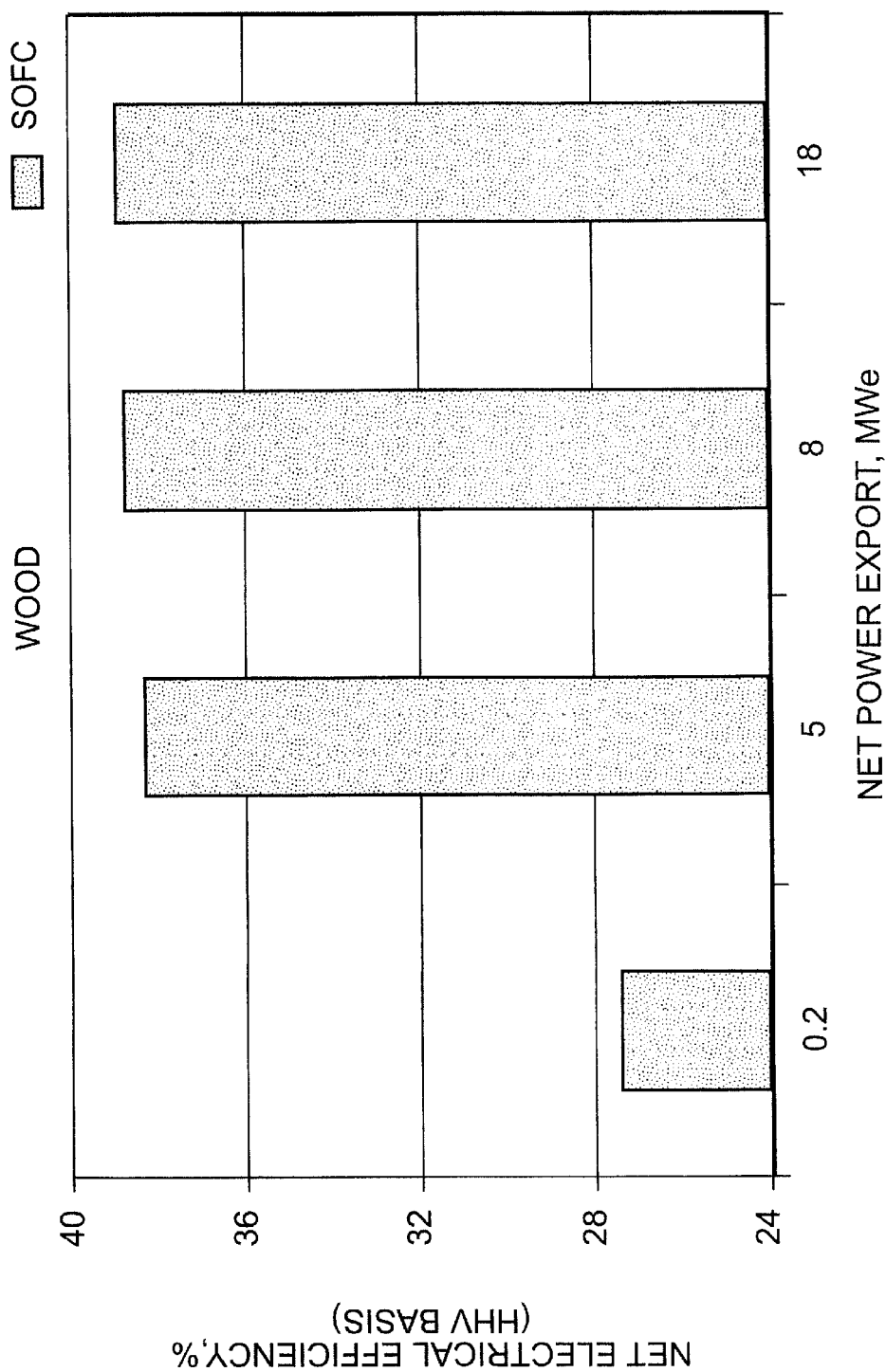
FIG. 17 is a graph showing the net electrical efficiency of different size systems made in accordance with the present invention.

The effect of plant size on efficiency of one embodiment of the present invention is exhibited in FIG. 17. The efficiency increases with system size due to relatively lower heat losses and higher cold gas efficiency on account of lower surface area-to-volume ratios. There is a dramatic jump in efficiency in going from 200 kW generator to 5 MW generator. The transportable size requirements for the 200 kW unit demand a relatively larger cross-section for the fluid bed to accommodate the pulse heater. This increases the steam flow rate and also the vessel surface area. The energy losses increase greatly and diminish the efficiency.

The emissions projected for the preferred embodiments of thermo-electrochemical systems of the present invention are listed in Table 12.

TABLE 12

PROJECTED EMISSIONS
Lb/MMBtu

| | Black Liquor | | | Wood | |
|---|---|---|---|---|---|
| | PAFC | MCFC | SOFC | SOFC | 1/10 NSPS |
| CO | 0.008 | 0.018 | 0.019 | 0.04 | |
| $SO_2$ | 0.063 | 0.054 | 0.044 | 0.00 | 0.12 |

TABLE 12-continued

PROJECTED EMISSIONS
Lb/MMBtu

| | Black Liquor | | | Wood | |
| --- | --- | --- | --- | --- | --- |
| | PAFC | MCFC | SOFC | SOFC | 1/10 NSPS |
| $NO_x$ | 0.013 | 0.016 | 0.016 | 0.002 | 0.06 |
| Particulates | <0.0001 | <0.0001 | <0.0001 | <0.0001 | 0.003 |

The categories include PAFC, MCFC and SOFC for black liquor processing and SOFC for wood processing. The emissions are listed on the basis of lb/MMBtu to enable comparison with the proposed new environmental regulations (one-tenth of New Source Performance Standards or 1/10 NSPS). Due to superior fuel gas cleanup and fuel cell integration, the emissions are all very low and are significantly lower than the proposed regulations. The differences among the cell types are partially due to the integration arrangement and the proportion of the fuel gas that flows through the gas polisher. The differences due to feedstock partially arise from the variation in fuel gas composition.

In one embodiment, the steam reformer can generally be made from a rectangular fluidized bed reactor through which the resonance tubes of a multiple tube pulse combustor pass. The following dimensions are for purposes of illustration. The fluidized bed dimensions can be about 2 ft wide by 6 ft long by 3 ft deep. In one embodiment, twenty-eight resonance tubes provide the reformer's heat requirement.

Steam, recycled product gas, or various other compositions can be used to fluidize the reformer. The bed can be preferably maintained at a velocity between 1.4 to 2 feet per second, which provides excellent heat transfer from the resonance tubes while minimizing the excessive use of steam. For embodiments with a mean particle size of 250 to 450 microns, for example, heat transfer coefficients of up to 200 Btu/ft2-h-F are obtained. Above the bed, the reformer vessel can preferably expand to dimensions of about 3 ft 9 in wide by 7 ft 9 in long. This expanded freeboard can be used both to reduce the gas velocity passing through the freeboard and to reduce entrainment losses, but can also provide a volume for primary gas/solids separation and vapors/steam residence time. With this size freeboard, either primary internal cyclones or impingement separators could be used.

To eliminate the possibility of internal cyclone plugging, a system of the present invention can utilize an impingement separator in this design. In one embodiment, once the raw product gases leave the reformer, they further pass through a pair of secondary cyclones. The char collected by these cyclones is collected for discharge. Wood chips are fed into the reformer by metering screws and an injection screw. Sufficient storage is provided for approximately 4 hours of feed. In the event there is more space at the site, a separate larger feed hopper could be provided.

Following secondary particle removal, the hot product gas preferably passes through a heat recovery steam generator (HRSG#1). Since the product gas may contain some condensable hydrocarbons, the "dirty" gas passes through the boiler tubes while boiling water is on the shell side. This approach can facilitate tube cleaning. The HRSG preferably contains 115 one-inch diameter tubes that are 3.5 ft long, providing slightly more than 105 $ft^2$ of heat transfer area. The shell is 3 ft in diameter.

The product gas can also be cooled, preferably to about 500 F. by HRSG #1 prior to entering the Venturi scrubber.

It is generally preferred that this scrubber have a throat diameter of approximately 2 inches. Gas velocity can be increased, preferably to 600 ft/sec in the narrow throat of the venturi and then expands into a liquid cyclone separator. It is preferred that the separator is 18 inches in diameter and 6 ft tall. In the embodiment, a liquid level of two feet is maintained in the bottom of the liquid cyclonic separator to provide a reservoir of water to the venturi scrubber recirculation pump. Moreover, a flow rate of 7 gpm is circulated through the venturi to provide the contact water for gas scrubbing. In the venturi scrubber, adiabatic cooling saturates gas. The temperature is reduced and excess water condensed in an indirect cross-flow cooler. The cooler is rectangular, 1 ft wide by 2.5 ft tall by 4 ft long. Gas flows horizontally through the cooler. Condensate is returned to the venturi gas/water separator prior to discharge. Following the gas cooler, a portion of the product gas is used as fuel in the pulse combustor and the rest goes to the fuel cell stacks located in an adjacent container of identical size.

The required firing rate for the pulse combustor is approximately 3 million Btu/h. The combustor consists of a combustion chamber and twenty-eight, six feet long resonance tubes. The tubes are actually 1.5-inch schedule 40 pipe, made of 310 stainless steel to permit operation at sufficiently high temperature (~1,650F.) to maintain the reformer at the required temperature of 1,475° F. The combustor is fired with a portion of the product gas from the fuel cell. Combustion air is also preheated to 340° F.

The pulse combustor exhaust leaving the reformer can also passe through a steam superheater in which the steam temperature is increased (preferably to about 1300° F.) prior to being used to fluidize the bed. In one embodiment, the hot flue gas can then enter a heat recovery steam generator (HRSG#2) similar to the one described previously on the fuel gas stream. In a preferred embodiment, the HRSG has in excess of 162 $ft^2$ of heat transfer area, including sections for generating medium pressure steam and high-pressure seam as well as for superheating the high-pressure (630 psig) steam to 750° F. The flue gas may then enter an air preheater prior to being stacked. In one embodiment, the air heater has about 60 ft2 of surface area, based on bare tubes. The flue gas leaving the air heater is stacked at a temperature of 275° F.

In one embodiment, the Fuel Cell stack, power conditioning, fuel gas polisher, and thermal integration equipment are installed in a second module. The thermal integration equipment can include an air preheater, a fuel preheater, and an economizer. The economizer heats boiler feedwater to the HRSG#2. In this packaging approach, the fuel processors and the fuel cell stack are contained in one skid. Heat from the cell stack is radiated to the wall of an annulus steam reformer fluid-bed that is indirectly heated by annulus resonance tubes of the pulse combustor designed for this size. The flue gas routed through a flue gas plenum heats the steam superheater tubes located below the fluid-bed reactor. The reactor shell is made of stainless 310 with no refractory lining. Ceramic fiber insulation encloses the annular area in which the flue passes after heating the superheater tube to insulate the unit.

Power conditioning and control equipment is located below the reactor/fuel cell integrated system. The fuel gas cleanup system is located on the same skid on the side and one HRSG can be located on the top left of the system. An additional HRSG could be employed (optional) to recover more heat from the flue gas depending on the local economics and could be placed on the same skid at an opposite position of the gas cleanup train. This is generally more likely in the case of a 40 kW system than it is in a 10 kW unit. The concentric configuration is contemplated for the 10 to 40 kW modules to reduce heat loss from the steam reformer and to enhance thermal integration between the cell stack and the reformer.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed:

1. A process for producing electricity from carbonaceous materials comprising the steps of:
    providing a fluidized bed containing a particulate material and a fluidizing medium, said fluidizing medium comprising steam;
    combusting a fuel source in a combustion device to form a combustion stream, said combustion stream indirectly heating said fluidized bed;
    feeding a carbonaceous material to said fluidized bed, said fluidized bed being at a temperature sufficient for said carbonaceous material to endothermically react with said steam to form a product gas stream;
    feeding said product gas stream to a fuel cell, said fuel cell using said product gas stream to generate electricity; and
    feeding said product gas stream exiting said fuel cell to said combustion device for combustion therein.

2. A process as defined in claim 1, wherein said fuel cell comprises a phosphoric acid fuel cell.

3. A process as defined in claim 1, wherein said fuel cell comprises a molten carbonate fuel cell.

4. A process as defined in claim 1, wherein said fuel cell comprises a solid oxide fuel cell.

5. A process as defined in claim 1, wherein said carbonaceous material comprises a material selected from the group consisting of coal, pulp and paper waste, wood products, municipal waste, sewage, food waste, plant matter, animal waste and mixtures thereof.

6. A process as defined 1, wherein said carbonaceous material comprises wood.

7. A process as defined in claim 1, wherein said carbonaceous material comprises black liquor.

8. A process as defined in claim 1, wherein said fluidized bed is maintained at a temperature of from about 1000 degrees F. to about 1600 degrees F.

9. A process as defined in claim 1, further comprising the step of preheating an air stream using said combustion stream exiting said fluidized bed, said air stream being fed to said combustion device for combustion with said fuel source.

10. A process as defined in claim 1, wherein said fuel cell comprises a molten carbonate fuel cell and wherein at least a portion of said combustion stream is fed to said fuel cell for supplying carbon dioxide.

11. A process as defined in claim 1, wherein said combustion device comprises a pulse combustion device.

12. A process as defined in claim 1, wherein a portion of said product gas stream is combusted to indirectly heat said fluidized bed.

13. A process as defined in claim 1, wherein prior to said fuel cell, said product gas stream is fed to a heat exchanger for heating steam fed to said fluidized bed.

14. A process as defined in claim 1, wherein after exiting said fluidized bed, said combustion products are fed to a heat exchanger for heating steam fed to said fluidized bed.

15. A process as defined in claim 1, wherein said carbonaceous material comprises rice straw and wherein the process further comprises the step of recovering silica from the fluidized bed during the process.

16. A process as defined in claim 1, wherein said carbonaceous material comprises animal waste and wherein the process further comprises the step of recovering a material selected from the group consisting of nitrogen, potassium, phosphorous and mixtures thereof during the process.

17. A system for generating electricity from carbonaceous materials comprising:
    a fluidized bed, said fluidized bed being configured to receive steam for fluidizing a particulate material;
    a combustion device comprising a combustor coupled to at least one resonance tube, said resonance tube extending into said fluidized bed for indirectly heating said bed;
    a feed inlet for feeding a carbonaceous material to said fluidized bed, said fluidized bed being configured to reform at least a portion of said carbonaceous material and thereby form a product gas stream;
    a fuel cell in communication with said fluidized bed for receiving said product gas stream, said fuel cell including an electrolyte, said fuel cell being configured to react said product gas with said electrolyte in order to generate electricity; and
    a product gas line extending from said fuel cell to said combustion device, said product gas line for feeding said product gas exiting said fuel cell to said combustion device for combustion therein.

18. A system as defined in claim 17, further comprising a heat exchanger for heating steam fed to said fluidized bed, said heat exchanger being in fluid communication with said fluidized bed for receiving said product gas stream used to heat said steam.

19. A system as defined in claim 17, further comprising a steam generator in communication with said combustion device, said combustion device producing a flue gas stream that is used to heat water and generate steam in said steam generator.

20. A system as defined in claim 17, wherein said combustion device comprises a pulse combustion device.

21. A system for generating electricity as defined in claim 17, wherein said system is capable of producing from about 10 kW to about 200 kW of power.

22. A system as defined in claim 17, wherein said fuel cell comprises a phosphoric acid fuel cell.

23. A system as defined in claim 17, wherein said fuel cell comprises a molten carbonate fuel cell.

24. A system as defined in claim 17, wherein said fuel cell comprises a solid oxide fuel cell.

25. A system as defined in claim 18, further comprising a second heat exchanger for heating steam fed to said fluidized bed, said second heat exchanger being in fluid communication with a flue gas stream exiting said combustion device.

26. A process for producing electricity from carbonaceous materials containing black liquor comprising the steps of:
    providing a fluidized bed containing a particulate material and a fluidizing medium, said fluidizing medium comprising steam;
    pulse combusting a fuel source in a pulse combustion device to form a pulse combustion stream, said pulse combustion stream indirectly heating said fluidized bed;

feeding waste materials to said fluidized bed, said waste materials containing black liquor, said fluidized bed being at a temperature sufficient for said black liquor to endothermically react with said steam to form a product gas stream;

feeding said product gas stream to a fuel cell, said fuel cell including an electrolyte for reacting with said product gas stream in order to generate electricity; and feeding said product gas stream exiting said fuel cell to said pulse combustion device for combustion therein.

27. A process as defined in claim 26, wherein said fluidized bed is maintained at a temperature of from about 1100 degrees F. to about 1500 degrees F.

28. A process as defined in claim 26, wherein said fuel cell comprises a phosphoric acid fuel cell.

29. A process as defined in claim 26, wherein said fuel cell comprises a molten carbonate fuel cell.

30. A process as defined in claim 26, wherein said fuel cell comprises a solid oxide fuel cell.

31. A process as defined in claim 26, wherein said product gas stream and said pulse combustion stream are fed to at least one heat exchanger for heating steam fed to said fluidized bed.

32. A process for producing electricity from wood comprising the steps of:

providing a fluidized bed containing a particulate material and a fluidizing medium, said fluidizing medium comprising steam;

pulse combusting a fuel source in a pulse combustion device to form a pulse combustion stream, said pulse combustion stream indirectly heating said fluidized bed;

feeding wood materials to said fluidized bed, said fluidized bed being at a temperature sufficient for said wood materials to endothermically react with said steam to form a product gas stream;

feeding said product gas stream to a fuel cell, said fuel cell including an electrolyte for reacting with said product gas stream in order to generate electricity; and feeding said product gas stream exiting said fuel cell to said pulse combustion device for combustion therein.

33. A process as defined in claim 32, wherein said fluidized bed is maintained at a temperature of at least 1400 degrees F.

34. A process as defined in claim 32, wherein said fuel cell comprises a phosphoric acid fuel cell.

35. A process as defined in claim 32, wherein said fuel cell comprises a molten carbonate fuel cell.

36. A process as defined in claim 32, wherein said fuel cell comprises a solid oxide fuel cell.

37. A process as defined in claim 32, wherein said product gas stream and said pulse combustion stream are fed to at least one heat exchanger for heating steam fed to said fluidized bed.

* * * * *